(12) United States Patent
Streid et al.

(10) Patent No.: US 8,587,497 B2
(45) Date of Patent: Nov. 19, 2013

(54) METHOD AND APPARATUS FOR A WIDE FIELD OF VIEW DISPLAY

(75) Inventors: Harold R. Streid, Ladue, MO (US); Carl J. Vorst, St. Ann, MO (US); Scott Phillip Rothman, St. Paul, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/467,283

(22) Filed: May 9, 2012

(65) Prior Publication Data

US 2012/0218170 A1 Aug. 30, 2012

Related U.S. Application Data

(62) Division of application No. 12/028,463, filed on Feb. 8, 2008, now Pat. No. 8,194,193.

(51) Int. Cl.
*G03B 21/00* (2006.01)
*H04N 9/31* (2006.01)
*G09B 9/08* (2006.01)

(52) U.S. Cl.
USPC ............. 345/1.3; 345/423; 345/1.2; 348/121; 348/123; 348/E9.025; 348/744; 434/38

(58) Field of Classification Search
USPC ............... 345/423, 1.2, 1.3; 434/38; 348/121, 348/123, 423, 744, E9.025
See application file for complete search history.

(56) References Cited

U.S. PATENT DOCUMENTS

| | | | | |
|---|---|---|---|---|
| 3,785,715 A | * | 1/1974 | Mecklenborg | 359/631 |
| 4,899,293 A | * | 2/1990 | Dawson et al. | 345/423 |
| 5,130,794 A | * | 7/1992 | Ritchey | 348/39 |
| 5,320,534 A | * | 6/1994 | Thomas | 434/44 |
| 5,862,252 A | * | 1/1999 | Yamamoto et al. | 382/154 |
| 6,137,492 A | * | 10/2000 | Hoppe | 345/420 |
| 6,152,739 A | * | 11/2000 | Amery et al. | 434/38 |
| 6,243,207 B1 | * | 6/2001 | Kawamura et al. | 359/630 |
| 6,373,489 B1 | * | 4/2002 | Lu et al. | 345/428 |
| 6,600,485 B1 | * | 7/2003 | Yoshida et al. | 345/419 |
| 6,618,049 B1 | * | 9/2003 | Hansen | 345/423 |
| 6,811,264 B2 | * | 11/2004 | Raskar et al. | 353/94 |
| 6,814,578 B2 | | 11/2004 | Vorst | |
| 6,871,958 B2 | * | 3/2005 | Streid et al. | 353/37 |
| 7,012,669 B2 | * | 3/2006 | Streid et al. | 352/69 |
| 7,414,595 B1 | * | 8/2008 | Muffler | 345/7 |
| 7,619,626 B2 | * | 11/2009 | Bernier | 345/427 |
| 7,656,402 B2 | | 2/2010 | Abraham et al. | |
| 7,663,793 B1 | | 2/2010 | Doucet | |

(Continued)

OTHER PUBLICATIONS

USPTO non-final office action dated Sep. 16, 2011 regarding U.S. Appl. No. 12/028,463, 17 Pages.

(Continued)

*Primary Examiner* — Alina N Boutah

(74) *Attorney, Agent, or Firm* — Yee & Associates, P.C.

(57) ABSTRACT

A method and apparatus for a uniform resolution display screen. In one embodiment, the uniform resolution display screen comprises a surface of the uniform resolution display screen having a curvature configured to display images with a uniform resolution across the display screen. The curvature is based on a projection distance from a projector to the uniform resolution display screen and a viewing distance from an eyepoint of an observer to the uniform resolution display screen. The geometry of the display screen is configured to display images associated with a high definition imaging format.

18 Claims, 14 Drawing Sheets

(56) References Cited

U.S. PATENT DOCUMENTS

| | | | |
|---|---|---|---|
| 7,675,513 | B2 | 3/2010 | Holland |
| 7,907,167 | B2 * | 3/2011 | Vesely et al. .................... 348/51 |
| 2002/0008909 | A1 * | 1/2002 | Nishikawa et al. ........... 359/487 |
| 2002/0042674 | A1 * | 4/2002 | Mochizuki et al. ............ 701/211 |
| 2003/0011535 | A1 * | 1/2003 | Kikuchi et al. .................... 345/6 |
| 2003/0043350 | A1 * | 3/2003 | Kitazawa ...................... 353/122 |
| 2003/0194683 | A1 * | 10/2003 | Vorst .............................. 434/38 |
| 2003/0224333 | A1 * | 12/2003 | Vastvedt ......................... 434/29 |
| 2005/0041211 | A1 * | 2/2005 | Streid et al. ..................... 352/85 |
| 2005/0041219 | A1 * | 2/2005 | Streid et al. ..................... 353/98 |
| 2006/0256113 | A1 * | 11/2006 | Grover et al. ................. 345/427 |
| 2008/0002161 | A1 * | 1/2008 | Streid et al. ..................... 353/98 |
| 2009/0066858 | A1 * | 3/2009 | Turner et al. ................. 348/744 |
| 2009/0189917 | A1 * | 7/2009 | Benko et al. ................. 345/647 |
| 2009/0231331 | A1 * | 9/2009 | Holland ........................ 345/419 |
| 2010/0027093 | A1 * | 2/2010 | Doucet ...................... 359/225.1 |
| 2012/0001915 | A1 * | 1/2012 | Peterson ...................... 345/428 |

OTHER PUBLICATIONS

USPTO notice of allowance dated Feb. 7, 2012 regarding U.S. Appl. No. 12/028,463, 7 Pages.

Response to office action dated Dec. 15, 2011 regarding U.S. Appl. No. 12/028,463, 12 Pages.

Response to restriction requirement dated Jul. 12, 2011 regarding U.S. Appl. No. 12/028,463, 10 Pages.

USPTO Restriction requirement dated Jun. 17, 2011 regarding U.S. Appl. No. 12/028,463, 6 Pages.

Amery et al., "Flight Simulation Visual Requirements and a New Display System," 2007, pp. 1-13, http://web.archive.org/web/20070107022346/http://www.rickleephoto.com/mosaicfresnel.htm.

EP search report dated Feb. 4, 2010 regarding U.S. Appl. No. 09/152,231, applicant The Boeing Company, 5 Pages.

* cited by examiner

METHOD AND APPARATUS FOR A WIDE FIELD OF VIEW DISPLAY

This Application is a divisional of application Ser. No. 12/028,463, filed Feb. 8, 2008, now issued as U.S. Pat. No. 8,194,193.

BACKGROUND INFORMATION

1. Field

The present disclosure relates generally to display systems. More particularly, the present application is directed to a method and apparatus for a visual image projection and display system that creates a wide field of view display using fixed matrix projectors that are preferably of high definition format.

2. Background

A simulator is a device that simulates a particular experience as realistically as possible. For example, a flight simulator simulates the experience of flying an aircraft, such as an airplane or helicopter. A vehicle driver simulator attempts to create the experience of driving a vehicle over streets or off-road terrains. Simulators typically use display systems to create a field of view displaying what the user might see if the user were actually flying an aircraft or driving a vehicle. Simulators may also provide simulated controls and steering devices associated with the particular aircraft or vehicle, and/or added motion to simulate movement of the aircraft or vehicle.

The visual systems currently in use in simulators were developed for use with four by three (4:3) aspect ratio cathode ray tube (CRT) projectors. However, currently available simulators do not fully exploit the recent advances in visual display technology, such as fixed matrix digital projectors in general, and especially High Definition Television (HDTV) format fixed matrix projectors with wide aspect ratios, such as, without limitation, sixteen by nine (16:9) aspect ratio format. Also, the modern fixed matrix projectors do not have the ability for image scaling without the loss of image resolution since the image source is made up of a mechanically fixed array of image sources instead of a continuous image surface, as with a CRT projector.

In addition, because the shape of the flat screen segments used to tessellate an arrangement of rear projection screens around the eyepoint in currently available simulators were designed for four by three (4:3) aspect ratio projectors, the resulting display systems are poorly suited to the use of wide aspect ratios typically used in high definition systems.

For simulation display purposes, the U.S. government has assumed a goal of providing eye-limited visual performance. Existing display systems have typically used arrangements of flat rear projection screens or dome shaped rear projection screens, neither of which are optimum for creating an eye-limited wide field of view display with uniform resolution from the eyepoint. In other words, existing display system screens are not capable of providing an eye-limited full field of view display for simulators, such as aircrew training systems.

SUMMARY

An embodiment of the present disclosure provides a uniform resolution display screen. In one embodiment, the uniform resolution display screen comprises a surface of the uniform resolution display screen having a curvature configured to display images with a uniform resolution across the display screen. The curvature is based on a projection distance from a projector to the uniform resolution display screen and a viewing distance from an eyepoint of an observer to the uniform resolution display screen. The geometry of the display screen is configured to display images associated with a high definition imaging format.

In another advantageous embodiment, a method of producing a uniform resolution image on a tessellation of spherical surfaces acting as rear-projection screens is provided. A tessellation of a sphere using spherical surfaces associated with a set of display screens is created. The tessellation of the spherical surfaces surrounds an eyepoint of a viewer on all sides and a top of the tessellation of the spherical surfaces. Each screen in the set of display screens has a selected curvature. A set of projectors generates images for display on the tessellation of the spherical surfaces associated with the set of display screens.

In yet another advantageous embodiment, a method is provided for producing a uniform resolution image from a tessellation of spherical surfaces acting as rear-projection screens. A set of side screens is selected. Each screen in the set of side screens has a selected curvature. A top screen is selected. The set of side screens and the top screen forms a tessellated sphere of display screens. A set of projectors is selected. Each projector in the set of projectors generates images for display on the tessellated sphere of display screens. The set of side screens, the top screen and the set of projectors forms a visual image and display system. The visual image and display system generates a full field of view display with a uniform resolution on a surface of the tessellated sphere of display screens.

In still another advantageous embodiment, a visual image projection and display system is provided. The visual image projection and display system comprises a set of screens having a selected curvature. The selected curvature is determined using a locus of points created by an intersection of lines drawn at equal angular increments from an eyepoint with a set of lines drawn at equal pixel increments at an image source through a projection point. Images displayed on screens in the set of screens having the selected curvature are displayed with uniform resolution. A set of projectors generate images displayed on the set of screens to form a full field of view display.

Another advantageous embodiment provides a visual image projection and display system that provides a tessellation of spherical surfaces acting as rear-projection screens. A geometrically normal ray from a point on a concave side of a first spherical surface in the tessellation of spherical surfaces intersects with a geometric normal ray from a point on a concave side of each other spherical surfaces in the tessellation of spherical surfaces at or near an eye position of an observer. A set of projectors is located on a convex side of each spherical surface in the tessellation of spherical surfaces. Each projector in the set of projectors generates an image to form a plurality of images. The plurality of images is displayed on the tessellation of spherical surfaces with uniform resolution.

Thus, the advantageous embodiments provide a method and apparatus for creating a full field of view display system to overcome the problem of inefficient utilization of an image generator and display pixels when pixels are projected by fixed matrix high definition format projectors rather than analog CRT projectors to form a continuous full field of view image on a rear projection screen for viewing. The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

A simulator is a device that simulates a particular experience as realistically as possible. For example, a flight simulator simulates the experience of flying an aircraft, such as an airplane or helicopter. A vehicle driver simulator attempts to create the experience of driving a vehicle over streets or off-road terrains. Simulators typically use display systems to create a field of view displaying what the user might see if the user were actually flying an aircraft or driving a vehicle. The simulator may also provide simulated controls and steering devices associated with the particular aircraft or vehicle, and/or added motion to simulate movement of the aircraft or vehicle.

Figure 1:
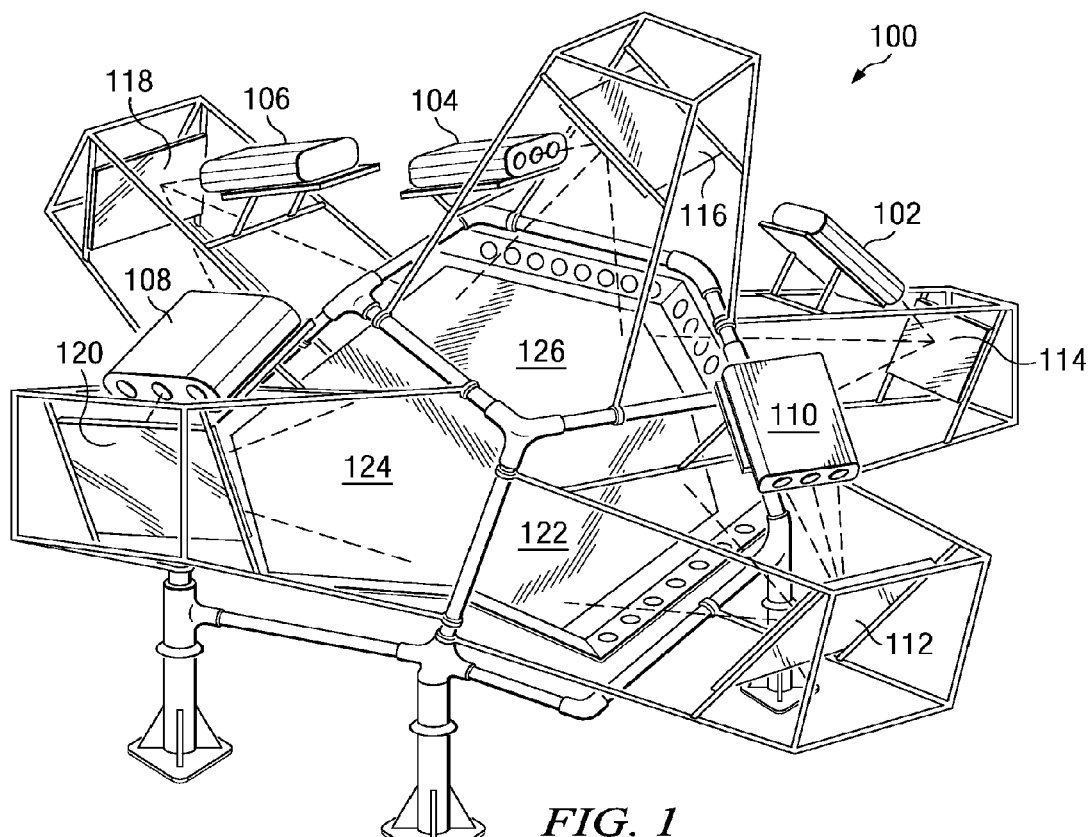
FIG. 1 is a block diagram of a prior art flight simulator.

FIG. 1 is a block diagram of a prior art flight simulator. Flight simulator 100 is a cathode ray tube (CRT) type rear-projection system flight simulator. Flight simulator 100 includes cathode ray tube (CRT) projectors 102-110. Each of CRT projectors 102-110 produces a light beam carrying an image. The image is projected onto a mirror, such as mirrors 112-120. Each mirror reflects the projected image onto a display screen, such as display screens 122-126.

CRT projectors 102-110 are capable of accommodating aspect ratios, other than four by three (4:3) aspect ratios, by rescaling of their horizontal and vertical image sizes. An aspect ratio refers to the relationship between the width and height of a display screen, such as display screens 122-126.

Each of display screens 122-126 displays a tessellated image that is part of a larger view image. In other words, the image on each display screen is a piece of a larger image. When the images are displayed on two or more of the screens at the same time, the display screens appear to present a single, large image. In this example, the larger image is an image of a view that might be seen through a window in a cockpit.

Flight simulator 100 utilizes a wide field of view rear projection display screen geometry based on a modified dodecahedron. A dodecahedron uses flat, regular pentagon shapes to tessellate a sphere. However, the rear projection display screen geometry based on a modified dodecahedron is not suitable for use with high definition format projectors.

Figure 2:
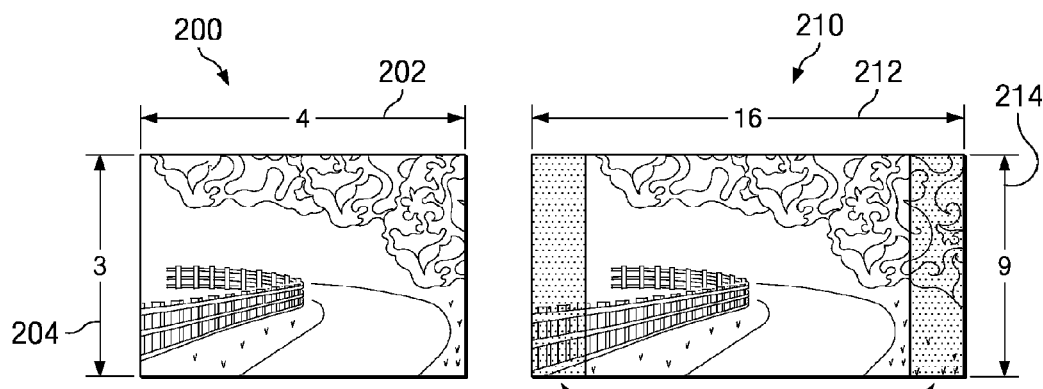
FIG. 2 is a block diagram showing an aspect ratio for a standard display screen and a high definition display screen.

FIG. 2 is a block diagram showing an aspect ratio for a standard display screen and a high definition display screen. Display screen 200 is a standard, CRT display screen. The aspect ratio is the ratio of the longer dimension (width) 202 and the shorter dimension (height) 204 of the display screen. In this case, the aspect ration is represented as a four by three (4:3), which is typical of standard CRT televisions.

High definition systems are designed for utilization with higher aspect ratios. In other words, high definition systems display images designed for screens with a greater width. In this example, display screen 210 is a display screen having a width 212 and height 214 relationship represented by a sixteen by nine (16:9) aspect ratio, which is a typical aspect ratio for high definition technologies. Display screens are not limited to four by three (4:3) or sixteen by nine (16:9) aspect ratio. Other aspect ratios may also be utilized in display screens.

Recent advances in visual display technology, specifically High Definition Television (HDTV) format fixed matrix projectors, have not been fully exploited because the visual systems currently in use were developed for use with four by three (4:3) aspect ratio CRT projectors, such as CRT projectors 102-110 in FIG. 1.

Figure 3:
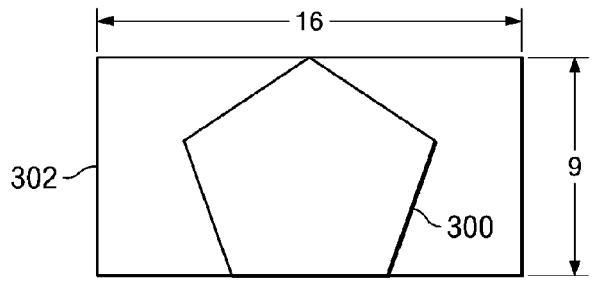
FIG. 3 is a block diagram illustrating a currently used display screen for use in a flight simulator based on the geometry of a modified dodecahedron.

FIG. 3 is a block diagram illustrating a currently used display screen for use in a flight simulator based on the geometry of a modified dodecahedron. Display screen 300 is an example of a display screen for a display system based on the dodecahedron, such as flight simulator 100 in FIG. 1. The shape of the flat screen segments used to tessellate an arrangement of rear projection screens around the eyepoint in these CRT projection systems were designed for four by three (4:3) aspect ratio projectors. The resulting display systems are poorly suited to use with the wide aspect format of high definition display systems, such as systems with sixteen by nine (16:9) aspect ratios.

Display screen 300 is a pentagon shaped panel that is not well suited to the use of fixed matrix high definition format projectors generating images with aspect ratios that are greater than four by three (4:3). When high definition projectors that are suited to longer and wider screens are used with commonly used screen geometries, such as the pentagon screen geometry of display screen 300, the higher aspect ratio image 302 falls off display screen 300, the image does not fill display screen 300 efficiently, and/or the image may appear warped. This results in waste and inefficient utilization of pixels to create the image.

Currently, complex screen geometries have evolved to try to optimize various display parameters such as resolution, brightness, and variation in eye-relief in CRT projector systems. Especially for wide format displays on flat screens, the pixel density, in terms of angular pixel separation as viewed by an observer located in a stationary position near the center of the screen, is greatest at the perimeter and least in the center of the display. Conversely, for a rear-projected dome display, angular pixel separation as viewed by the same observer located at the center of curvature of the screen is least at the center of the image and greater at its perimeter. Therefore, the advantageous embodiments recognize that currently used screen geometries do not provide for uniform image resolution.

Considerable investment in system design and fabrication infrastructure has been made for producing various configurations of these systems by several manufacturers. These capabilities have been exploited fully in the design of the current generation of CRT projection display systems to help balance out other limitations of CRT projectors, which results in a wide range of projector orientations and image aspect ratios.

In addition, existing display systems have typically used arrangements of flat rear projection screens but have also used spherical shaped rear projection screens. However, the dome shaped screens do not provide optimum resolution uniformity and are not well suited for high definition format, such as, without limitation, aspect ratios of approximately sixteen by nine (16:9).

It will be appreciated by one skilled in the art that the words "optimize", "optimization," "optimum," and related terms are terms of art that refer to improvements in display resolution, efficiency in pixel utilization, and image quality, and do not purport to indicate that a display system has achieved, or is capable of achieving, an "optimal" or perfectly uniform resolution, perfect image quality, or flawless image display.

The embodiments recognize that the current flat rear projection screens and the spherical shaped rear projection screens are not optimum for creating a wide field of view display with uniform resolution from the eyepoint, which is a highly desirable characteristic of a display to be used for training pilots in tactical situations.

Prior art tessellations of images displayed on screens are designed to utilize CRT projectors, which are nominally four by three (4:3) aspect ratios with analog adjustment of raster size and aspect. These analog adjustments allow accommodation of a variety of screen shapes without loss of image resolution; however, increasingly limited consumer use has restricted CRT technology development and increased its cost.

In addition, prior art display systems utilize complex configurations of screen types. For example, the M2DART display system uses eight (8) different screen types. The VIDS display system uses seven (7) different screen types, including left/right variations. Another prior art display system has only one screen type, but variations in projector orientation result in different roll orientations for each screen, which is not a serious problem for CRT projectors that can be rolled arbitrarily but is a significant complication for high definition format fixed matrix projectors which usually cannot be rolled and must use mirrors to rotate the image on the screen. In addition, the VIDS and M2DART systems have screens that are all different and there is no symmetry across channel boundaries, which results in poor color and intensity match across channel boundaries.

The advantageous embodiments recognize that existing display system geometries are not compatible with the goal of eye-limited visual performance for aircrew training systems. For simulation display purposes, eye-limited visual performance may be considered to be equivalent to an angular sub-tense for two adjacent pixels of two arc-minutes. This corresponds to 20/20 visual acuity in the Snellen eye chart, which is used to characterize human visual performance. The 20/20 visual acuity standard is commonly considered to be "normal" visual performance when judging the need for corrective lenses and other vision correction measures.

Currently available display system technologies cannot currently meet the goal of providing eye-limited visual performance in simulators. Thus, the advantageous embodiments recognize the need for an affordable, wide field of view display system which is optimized for the current and future generation of high definition format projectors by the most efficient use of projector pixels, which provides an optimum uniformity of resolution, minimum number and complexity of projector installation orientations, and which can be fielded near-term with 20/40 acuity and upgraded in the future to 20/20 by a simple projector replacement.

Recent advances in display microchips are resulting in projectors with much higher resolution and reduced support costs, but this new technology is most economically available in high definition, wide aspect ratio format. In addition, the trend toward wide format displays is likely to continue indefinitely due to the high demand for high definition and digital cinema systems. Moreover, the display industry is investing most current development effort to building high-volume display microchip foundries for fabrication of approximately sixteen by nine (16:9) displays. Any advances in performance or reduction in cost will be of this wide format display type.

Therefore, the advantageous embodiments also recognize the need to reassess the trade-offs, which were made in past designs to live with the low brightness of CRT projectors in the light of the much greater brightness of the new wide format high definition digital projectors. The embodiments also recognize the need for an improved, full field of view visual system for training the crew of tactical air vehicles that is capable of using high definition display technologies.

A full field of view display is a display that simulates the full field of view as seen by an observer in a simulated environment. For example, a full field of view display for a flight simulator would provide a display image that simulates everything a pilot in an aircraft might see while inside the cockpit of a particular aircraft. In contrast, a wide field of view display is less than a full field of view. For example, a wide field of view may provide images simulating what the pilot inside a cockpit would see within a 180 degree range rather than an approximately 270 or 360 degree range as might be provided in a full field of view display. Thus, the advantageous embodiments recognize a need for screen geometries that more closely match high definition image sources and more efficient utilization of pixels during image generation to create wide field and full field of view displays.

An embodiment of the present disclosure provides a uniform resolution display screen. In one embodiment, the uniform resolution display screen comprises a surface of the uniform resolution display screen having a curvature configured to display images with a uniform resolution across the display screen. The curvature is based on a projection distance from a projector to the uniform resolution display screen and a viewing distance from an eyepoint of an observer to the uniform resolution display screen. The geometry of the display screen is configured to display images associated with a high definition imaging format.

In another advantageous embodiment, a method of producing a uniform resolution image from a tessellation of spherical surfaces acting as rear-projection screens is provided. The tessellation of the spherical surfaces is not necessarily uniform. In this embodiment, the tessellation of the spherical surfaces is a tessellation of a set of screens. Each of the screens has a selected curvature. The tessellation of spherical surfaces surrounds the eyepoint of a viewer on all sides and top with a set of display screens.

In another embodiment, the tessellation of spherical surfaces comprises a set of one or more lower side screens having a first selected curvature. A set of upper side screens may also are also included. The screens in the set of upper side screens have a second selected curvature. The set of upper side screens includes one or more upper side screens. The lower side screens and upper side screens are partial side screens. In other words, a partial side screen does not completely cover a side of a simulator. Each screen in the set of lower side screens is coupled to a corresponding screen in the set of upper side screens to from a complete side screen. The complete side screen comprising two or more partial side screens may be referred to as a side screen pair. Thus, the set of upper side screens and the set of lower side screens forms a set of side screen pairs. A top screen is selected. The set of lower side screens, the set of upper side screens, and the top screen forms a tessellated sphere of display screens.

A set of one or more projectors is selected. Each projector in the set of projectors generates images formatted for high definition. The set of side screen pairs, the top screen, the set of side screen projectors, and the top screen projector forms a visual image and display system. The visual image and display system generates a full field of view display with a uniform resolution on a surface of the tessellated sphere of display screens.

In another advantageous embodiment, a method of producing a uniform resolution image on a tessellation of spherical surfaces acting as rear-projection screens is provided. A tessellation of a set of display screens forming a sphere of display screens is selected. The tessellation of the set of display screens surrounds an eyepoint of a viewer on all sides and a top of the sphere. Each screen in the set of display screens has a selected curvature. A set of projectors is selected. Each projector in the set of projectors generates images for display on the tessellation of the set of display screens. The set of display screens and the set of projectors form a visual image and display system. The visual image and display system generates a full field of view display with a uniform resolution on a surface of the tessellated sphere of display screens.

In yet another advantageous embodiment, a method is provided for producing a uniform resolution image from a tessellation of spherical surfaces acting as rear-projection screens. A set of side screens is selected. Each screen in the set of side screens has a selected curvature. A top screen is selected. The set of side screens and the top screen forms a tessellated sphere of display screens. A set of projectors is selected. Each projector in the set of projectors generates images for display on the tessellated sphere of display screens. The set of side screens, the top screen and the set of projectors forms a visual image and display system. The visual image and display system generates a full field of view display with a uniform resolution on a surface of the tessellated sphere of display screens.

In still another advantageous embodiment, a visual image projection and display system is provided. The visual image projection and display system comprises a set of screens having a selected curvature. The selected curvature is determined using a locus of points created by an intersection of lines drawn at equal angular increments from an eyepoint with a set of lines drawn at equal pixel increments at an image source through a projection point. Images displayed on screens in the set of screens having the selected curvature are displayed with uniform resolution. A set of projectors generate images displayed on the set of screens to form a full field of view display.

Another advantageous embodiment provides a visual image projection and display system that provides a tessellation of spherical surfaces acting as rear-projection screens. A geometrically normal ray from a point on a concave side of a first spherical surface in the tessellation of spherical surfaces intersects with a geometric normal ray from a point on a concave side of each other spherical surfaces in the tessellation of spherical surfaces at or near an eye position of an observer. A set of projectors is located on a convex side of each spherical surface in the tessellation of spherical surfaces. Each projector in the set of projectors generates an image to form a plurality of images. The pluralities of images are displayed on the tessellation of spherical surfaces with uniform resolution.

The uniform resolution produced by the uniform resolution curvature of the embodiments is not required to be precisely uniform resolution of the image across the screen. Uniform resolution is a term of art that refers to improvements in display resolution or substantially uniform resolution and does not purport to indicate that a display system has achieved, or is capable of achieving, a perfectly uniform resolution, perfect image quality, or flawless image display.

The display system of the advantageous embodiments provides tessellation optimized for efficient use of high definition aspect ratio display formats, such as, but not limited to, sixteen by nine (16:9) aspect ratio formats. The display system provides 20/40 acuity display configurations and 20/20 acuity display configurations that differ only by number of pixels provided by each projector. Thus, embodiments for the 20/40 display configuration system can be easily upgraded to a 20/20 acuity display configuration. In addition, the display system does not require projectors to be rolled about their optical axis. The radial symmetry about vertical axis also allows modularity of screen segments, projector support structure, and image generator hardware. The embodiments having the more optimum screen curvature enables uniform resolution and minimizes wasted pixels.

In this manner, a wide field of view display system for simulators that meets either a near 20/20 acuity requirement for the visual display or a 20/40 acuity requirement. Where the system has 20/40 acuity, the display system of the advantageous embodiments can be easily upgraded to provide a full field of view display with a 20/20 acuity.

The embodiments in FIGS. 4-21 are described as primarily being implemented in display systems having sixteen by nine (16:9) aspect ratios or approximately 16:9 aspect ratios. However, the embodiments are not limited to implementation in systems having 16:9 aspect ratios. The embodiments may be implemented in any system having fixed matrix projectors with any aspect ratio without departing from the scope of the embodiments. For example, the embodiments may be implemented using projectors for generating images having aspect ratios including, but not limited to, four by three (4:3), three by two (3:2), and one by one (1:1). The embodiments also encompass display systems having aspect ratios of approximately 16:9 in compliance with standards such as, without limitation, the Digital Cinema Initiatives (DCI) standards of 4096×2160 pixels and 2048×1080 pixels, as well as the Video Electronics Standards Association (VESA) standards which specify 1920×1200 pixels for approximately 16:9 aspect ratios.

Figure 4:
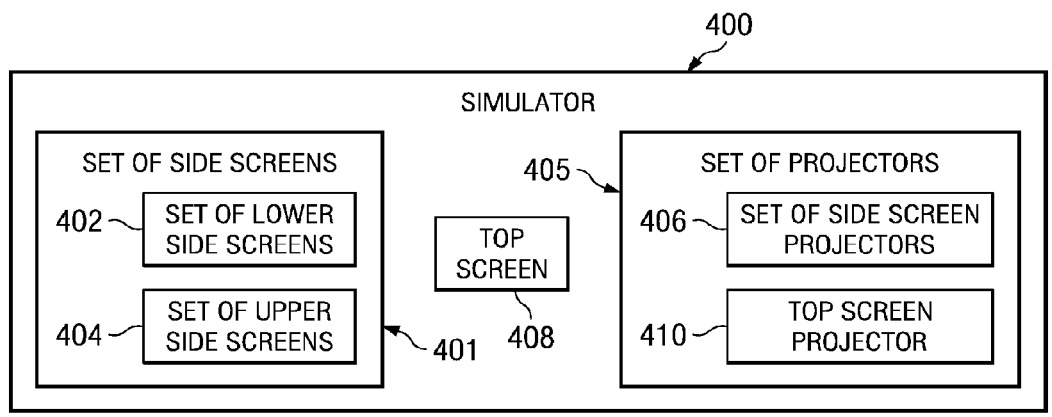
FIG. 4 is a block diagram of a simulator in accordance with an advantageous embodiment.

FIG. 4 is a block diagram of a simulator in accordance with an advantageous embodiment. Simulator 400 is any type of visual display system for providing a full field of view display, such as, but not limited to, a flight simulator, a vehicle driver simulator, a planetarium display system, or any other type of full field of view display system. In this example, simulator 400 is a flight simulator.

Simulator 400 includes set of side screens 401. Set of side screens 401 is a set of one or more display screens. In other words, set of side screens 401 may include a single screen or two or more screens. The screens in set of side screens 401 may be flat display screens or display screens that are curved to create uniform resolution of the full view image displayed on the screens.

Set of side screens 401 optionally includes partial side screens, such as, without limitation, set of lower side screens 402 and set of upper side screens 404. In this example, a single lower side screen and an associated upper side screen forms a side screen pair. A side screen pair is a side screen that is formed by connecting an upper side screen to a lower side screen member. In another embodiment, a side screen is a single unit or member, rather than a screen comprising an upper portion and a lower portion.

Set of lower side screen 402 includes two or more screens. The screens may be any shape or size. For example, and without limitation, the screens may be rectangular, square, trapezoidal, pentagonal, or any other n-sided polygon geometry shape. The screens may be front projection screens or rear projection screens. In this example, set of lower side screens 402 includes, without limitation, rear projection rectangular screens.

Set of upper side screens 404 includes two or more screens. For example, and without limitation, the screens may be rectangular, square, trapezoidal, pentagonal, or any other shape. The screens may be front projection screens or rear projection screens.

In this example, set of upper side screens 404 includes, without limitation, rear projection trapezoidal screens, in which one upper side screen is associated with each lower side screen in set of lower side screens 402. In other words, each upper side screen has a corresponding lower side screen. Thus, if set of lower side screens 402 includes five screens, then set of upper side screens 404 also includes five screens. However, if set of lower side screen includes six screens, then set of upper side screens also includes six screens.

In this example, simulator 400 includes six rectangular-trapezoidal side screens and six trapezoidal upper side screens. However, simulator 400 may also have only five rectangular-trapezoidal side screen pairs, rather than six rectangular-trapezoidal side screen pairs. Likewise, the embodiments are not limited to rectangular-trapezoidal side screen pairs. The upper and lower side screens may be any shaped screens for displaying images.

Set of projectors 405 is a set of one or more projectors. The projectors in set of projectors 405 may be homogenous projectors of the same type, the same aspect ratio, and/or the same number of pixels. In another embodiment, set of projectors 405 includes heterogeneous projectors having different types of projectors, different numbers of pixels, and/or generating images with different aspect ratios.

Set of projectors optionally includes set of side screen projectors 406. Set of side screen projectors 406 is a set of one (2) or more projectors associated with each side screen in set of side screens 401. Set of side screen projectors 406 may include any number of projectors, including, without limitation, one (1) projector, five (5) projectors, ten (10) projectors, twelve (12) projectors, fifteen (15) projectors, eighteen (18) projectors, twenty-six (26) projectors, or any other number of projectors.

In this embodiment, set of side screen projectors 406 includes projector modules which are identically configured with four (4) projectors for each rectangular-trapezoidal side screen pair for the hexagonal footprint configuration of the six-sided simulator configuration. In this configuration, three projectors are overlapped and blended on each large rectangular screen in set of rectangular lower side screens 402 and a single projector displays an image on each trapezoidal screen in set of trapezoidal upper side screens 404 to form the mounting arrangement of four projectors for each rectangular-trapezoidal screen pair. However, in another embodiment, the two or more projectors are configured in a non-overlapping manner such that each side screen has a single projector and the projectors used on the larger rectangular lower side screens may be of a different type from the ones used on the trapezoidal upper side screen.

Thus, set of side screen projectors 406 includes a total of twenty-four (24) projectors, in which four projectors project an overlapping image onto each rectangular-trapezoidal side screen pair. If simulator 400 has only five sides instead of six sides, set of side screen projectors 406 in a four (4) projector-modular mounting configuration includes twenty (20) projectors.

In another embodiment, set of side screen projectors 406 includes projectors in a three (3) projector-mounting configuration for each rectangular-trapezoidal side screen pair. In this example, where there are six side screen pairs, set of side screen projectors 406 is a set of eighteen (18) projectors. Where simulator 400 has only five side screen pairs, set of side screen projectors 406 has fifteen (15) projectors.

In yet another embodiment, set of side screen projectors includes a single projector for each side screen. In such a case, set of side screen projectors 406 may include a single projector if there is only a single side screen in set of side screens 401, five projectors if set of side screens 401 includes five side screens, or six projectors if set of side screens 401 includes six side screens.

Simulator 400 optionally includes top screen 408. Top screen 408 is a single top screen for displaying images in a high definition format. Top screen 408 may be a square shape, a pentagonal shape, a hexagonal shape, or any other shaped screen for displaying images. In this example, top screen 408 is a hexagonal top screen.

Set of projectors 405 optionally includes top screen projector 410. Top screen projector 410 is one or more projectors in a unique projector arrangement for top screen 408. For example, top screen projector 410 may include, without limitation, a single projector or a pair of projectors. In this embodiment, none of the images are rotated on the screen so additional mirrors may not be required for projector roll. In other words, the projectors in set of side screen projectors 406 and top screen projector 410 are oriented with zero roll.

Simulator 400 may optionally include a set of one or more mirrors (not shown). One or more projector images may be rotated into portrait mode using one or more mirrors. Also, in this embodiment, set of side screens 401 includes two types of side screens, upper side screens and lower side screens. In another embodiment, set of side screens 401 is a single type of side screen. In other words, all the side screens in set of side screens 401 is a single size and shape of side screen. In another example, set of side screens 401 includes three or more types of side screens. In this example, set of side screens 401 includes screens having two or more sizes of screens and/or two or more shapes of screens.

Figure 5:
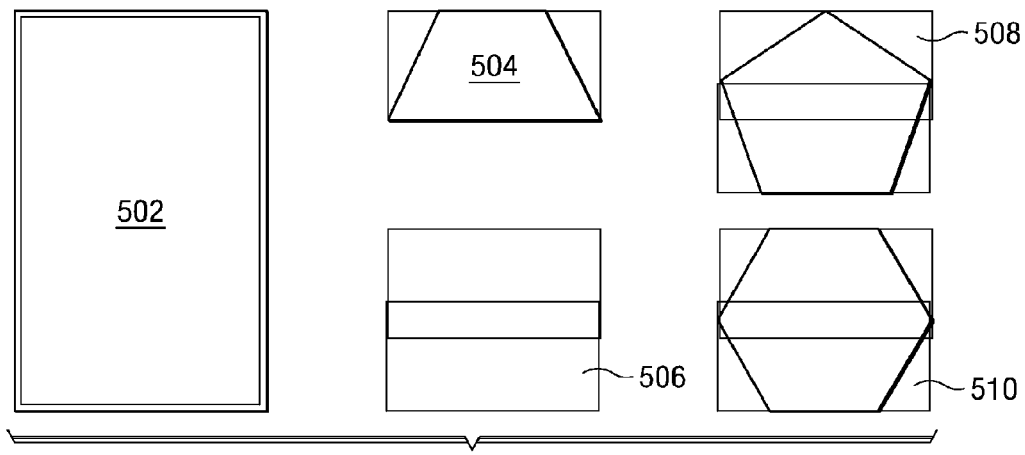
FIG. 5 is a block diagram of display screens in accordance with an advantageous embodiment.

FIG. 5 is a block diagram of display screens in accordance with an advantageous embodiment. In this embodiment, only three different display screen types are provided for utilization in a single simulator.

Rectangular screen 502 is a rectangular display screen. In this example, rectangular screen 502 is a rear projection screen, such as, without limitation, a screen in set of rectangular lower side screens 402 in FIG. 4.

Trapezoidal screen 504 is a rear projection high definition format display screen, such as the screens in set of trapezoidal upper side screens 404 in FIG. 4. Trapezoidal screen 504 is arranged directly above rectangular screen 502 and is tilted toward the eyepoint at approximately forty-five (45) degrees.

Top screen 506 is a rear projection top screen having a square shape. Top screen 508 is a rear projection screen having a pentagonal shape. Top screen 510 is a hexagonal rear projection top screen. Only a single top screen is used for a single simulator, such as top screen 408 in FIG. 4. The top screen may be a square top screen, such as top screen 506, a pentagonal top screen, such as top screen 508, or a hexagonal top screen, such as top screen 510. In this example, the top screen is a top screen with approximately sixteen by nine (16:9) image overlays.

Thus, this embodiment provides display screens and display screen image tessellations optimized for fixed matrix projectors where a user may not be able to alter, adjust, or modify the geometry of the image generated by the projectors, such as, without limitation, high definition aspect ratio projectors having approximately sixteen by nine (16:9) aspect ratios. In addition, the screen configurations are symmetrical across all channel boundaries except for the top screen.

Display screen 502 may be used with a set of two or more screens to form a tessellation of screens. However, the embodiments do not require the display screens to be used in a tessellation of screens. Each display screen in display screens 502-510 may be used alone or in combination with one or more other screens to display images. In other words, display screen 502 may be used as a single display screen alone to display images or display screen 502 may be used in conjunction with one or more other display screens to display images. Moreover, each display screen in display screens 502-510 may be a flat screen or a screen having an optimized curvature for displaying images with uniform resolution. Thus, in one embodiment, display screen 502 has an optimized curvature and is used alone without any other display screens or in conjunction with one or more additional display screens to display images with uniform resolution. The one or more additional display screens may optionally be flat screens or screens having an optimized curvature for displaying images with uniform resolution.

The display screens in FIG. 5 may be manufactured or created using any known or available methods for creating display screens having a flat surface. The display screens may be manufactured using any type of material for manufacturing display screens. In another embodiment, the display screens have an optimum curvature to display an image with substantially uniform resolution. In this embodiment, the display screens may be custom manufactured to produce the curved screens having the selected curvature, in addition to, or instead of manufacturing according to known methods.

Figure 6:
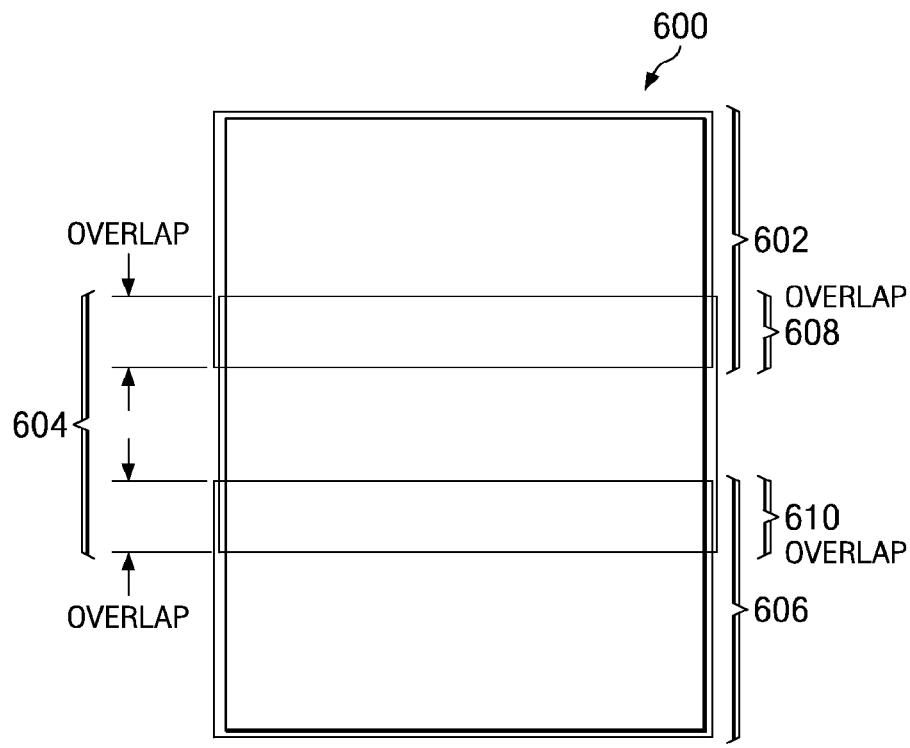
FIG. 6 is a block diagram illustrating a rectangular lower side screen with three (3) sixteen by nine (16:9) overlays in accordance with an advantageous embodiment.

FIG. 6 is a block diagram illustrating a rectangular lower side screen with three (3) image overlays in accordance with an advantageous embodiment.

Screen 600 may be any type of display screen for displaying an image. In this example, screen 600 is a rectangular rear projection screen for high definition format images, such as, without limitation, a screen in set of rectangular lower side screens 402 in FIG. 4.

A set of two (2) or more projectors projects an overlapping image on screen 600 to form the image overlays. In this example, each projector in a set of three (3) projectors projects an overlapped and blended image on screen 600. A first projector projects image 602. A second projector projects image 604 onto rectangular screen 600. A third projector projects image 606 onto rectangular screen 600 to form a blended image on rectangular screen 600. Overlap 608 occurs where a lower portion of image 602 overlaps with an upper portion of image 604. Overlap 610 occurs where a lower portion of image 604 overlaps with an upper portion of image 606. Blending of the overlapping portions 608 and 610 of images 602-606 may be performed using any known or available technique for merging the images from multiple projectors into a single blended image.

Figure 7:
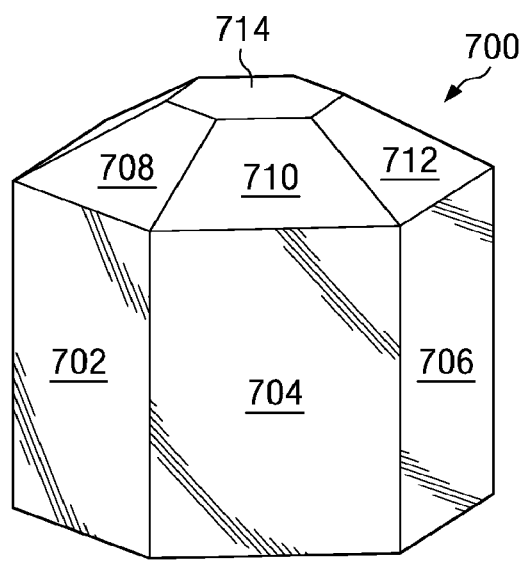
FIG. 7 is a block diagram of a hexagonal arrangement of six flat rectangular-trapezoidal side screen pairs in accordance with an advantageous embodiment.

FIG. 7 is a block diagram of a hexagonal arrangement of six flat rectangular-trapezoidal side screen pairs in accordance with an advantageous embodiment. Simulator 700 is a simulator for producing a full field of view display, such as simulator 400 in FIG. 4.

Rectangular lower side screens 702-706 are rectangular, high definition format rear projection screens, such as rectangular screen 502 in FIG. 5. Simulator 700 is a hexagonal arrangement of six (6) vertical rectangular-trapezoidal side screen pairs. In this figure, three (3) of the side screen pairs are visible and three (3) of the side screen pairs are not visible.

Trapezoidal upper side screens 708-712 are arranged directly above each large rectangular lower side screen. Each of trapezoidal upper side screens 708-712 is associated with a corresponding rectangular lower side screen. In this figure, rectangular lower side screen 702 is arranged directly below trapezoidal upper side screen 708. Rectangular lower side screen 704 and trapezoidal upper side screen 710 forms a rectangular-trapezoidal side screen pair. Trapezoidal upper side screen 712 is arranged directly above rectangular lower side screen 706 to form another rectangular-trapezoidal side screen pair.

Top screen 714 is a single, rear projection top screen. Top screen 714 may be a square shape, such as top screen 506 in FIG. 5, a pentagon shape, such as top screen 508 in FIG. 5, or a hexagonal shaped top screen, such as top screen 510 in FIG. 5.

Trapezoidal upper side screens 708-712 are tilted downward toward the eyepoint at approximately forty-five (45) degrees in this example. The rectangular lower side screens are tilted at approximately ninety (90) degrees upward. The rectangular-trapezoidal side screen pairs provide 360-degree horizontal full field of view.

The long axis of projectors as mounted for large rectangular lower side screens 702-706 and trapezoidal upper side screens 708-712 are all horizontal so that no projector roll is required and so that all of the projectors for each large rectangular screen and the trapezoidal screen above it can be mounted on a common mechanical structure, which is identical for each of the rectangular-trapezoidal screen pairs.

Figure 8:
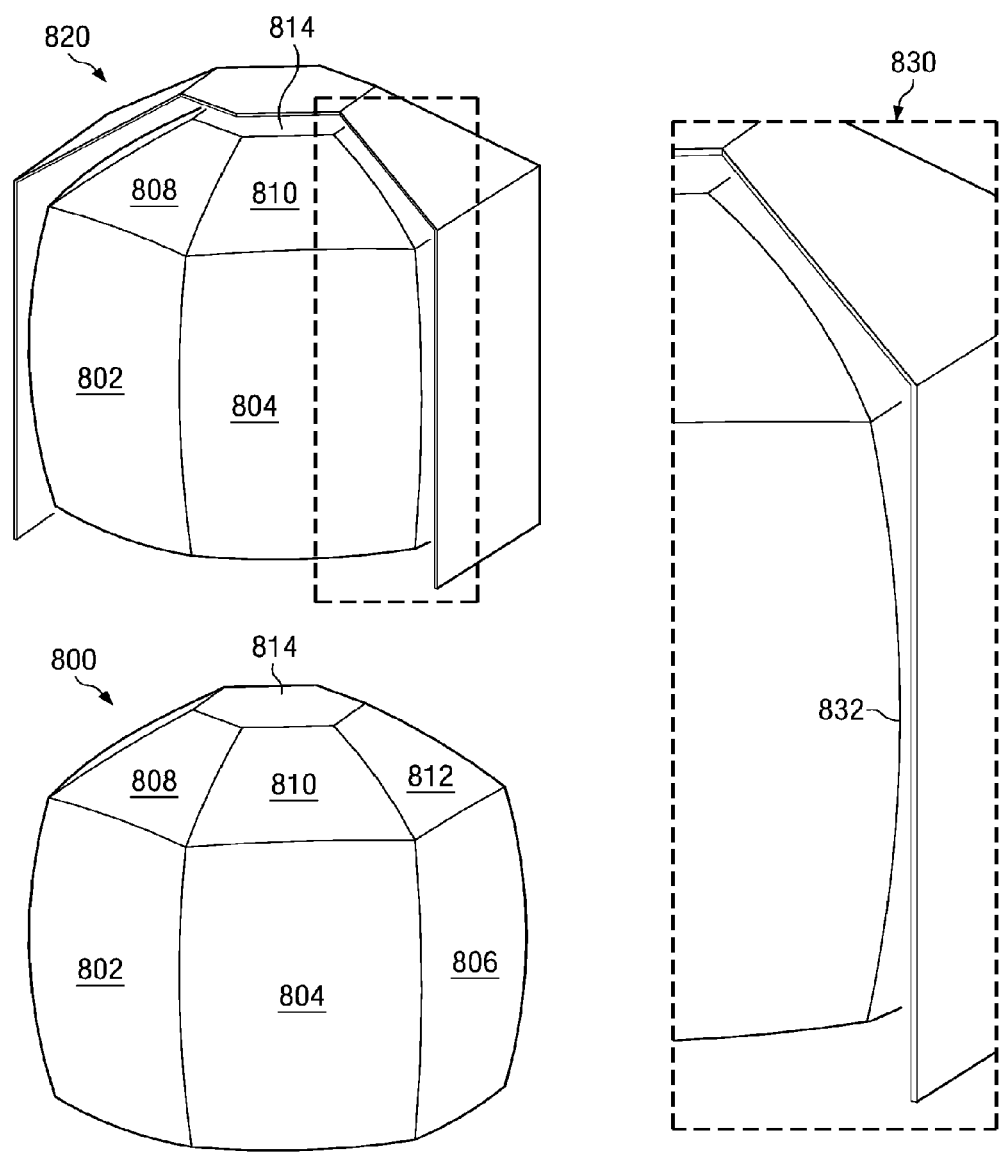
FIG. 8 is a block diagram of a hexagonal arrangement of six rectangular-trapezoidal side screen pairs with uniform resolution curved screens in accordance with an advantageous embodiment.

FIG. 8 is a block diagram of a hexagonal arrangement of six (6) rectangular-trapezoidal side screen pairs with uniform resolution curved screens in accordance with an advantageous embodiment. Simulator 800 is a simulator, such as simulator 400 in FIG. 4.

Rectangular lower side screens, such as rectangular screens 802-806 are curved rather than flat screens. The trapezoidal upper side screens, such as trapezoidal screens 808-812, and top screen 814 are slightly curved. Simulator 800 generates the same field of view as the flat screens in simulator 700 in FIG. 7, except that the full field of view image has a uniform resolution.

Simulator 820 is a cross section illustrating the optimum uniformity curved screen generated from flat screens by projecting edges onto a spherical surface of optimum radius based on the eyepoint and projector. Section 830 is a view of curvature 832 in rectangular screen 806 and trapezoidal screen 812. Curvature 832 in the rectangular-trapezoidal screen pair produces a uniform resolution in the full field of view screen.

Figure 9:
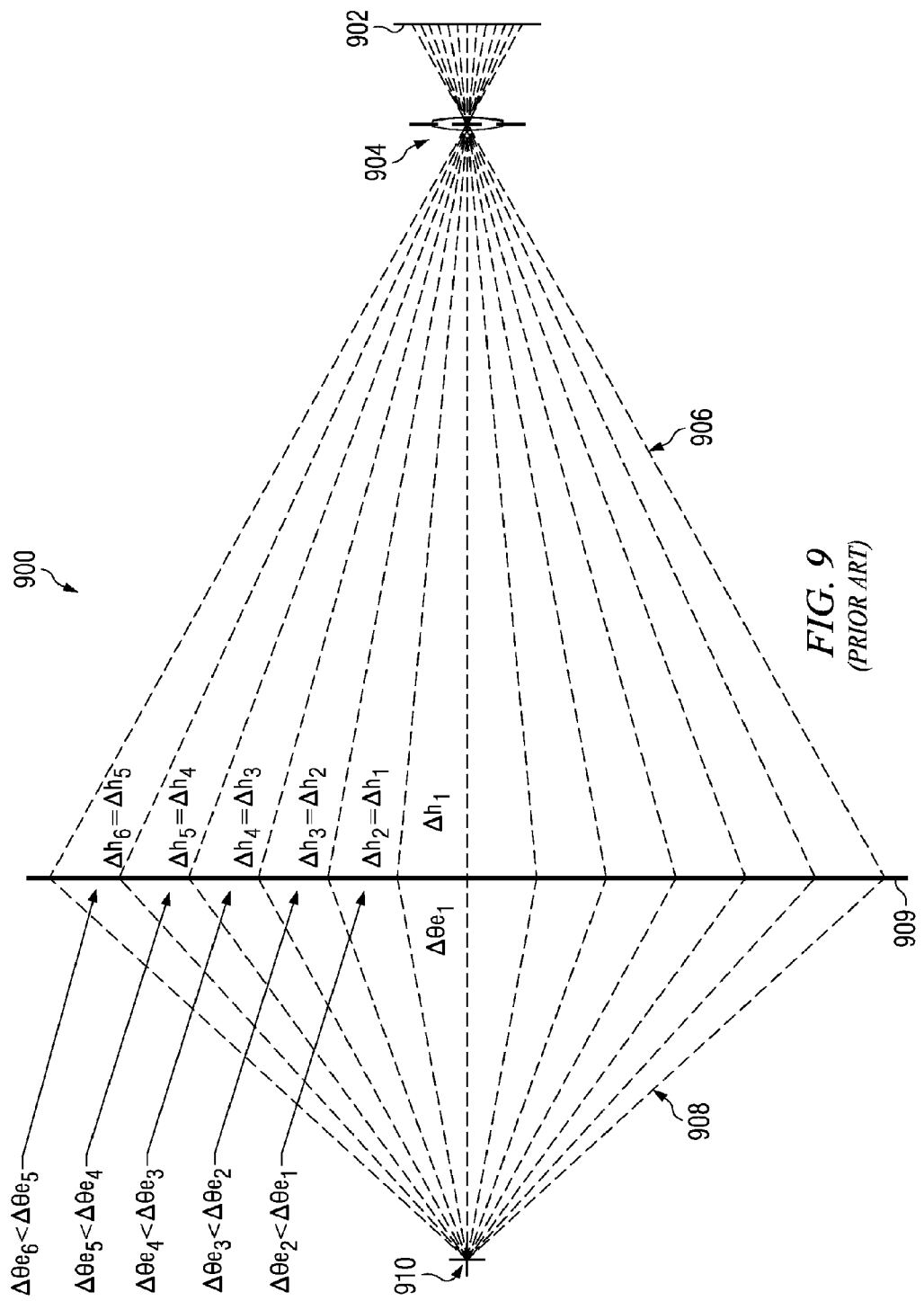
FIG. 9 is block diagram of a prior art flat rear-projected screen.

FIG. 9 is a block diagram of a prior art flat rear-projected screen. Projection geometry 900 is an illustration of an image projected onto a flat, rear-projection screen. Image origin 902 is an origin of an image generated by a fixed rectangular array of sources associated with a high definition format projector, such as an array of pixels. Convention projection lens 904 is a lens for focusing and magnifying the image produced by the fixed rectangular array of sources. Conventional projection lens 904 is typically located inside the projector.

Rays 906 are light rays carrying the image. Rays 906 are projected from the image source. In this case, the image source is the projector. Rays 906 are separated by a fixed distance "Δh". Thus, rays 906 are equally spaced height rays projected onto plane 909, which represents a flat screen.

Rays 908 are projected with a constant increment of height "Δh" to produce a higher angular resolution at the edge of the flat screen represented by plane 909 than at the center of flat screen 909. When equally spaced height rays 906 are projected onto plane 909, unequal angles 908 result when the image is viewed at eyepoint 910. Thus, the resolution of the image displayed on flat screen 909 varies in resolution from the center of the screen to the edges of the screen when viewed by an observer inside a simulator at approximately the center of the simulator at design eyepoint 910 to create a non-uniform image resolution on the flat screen.

Figure 10:
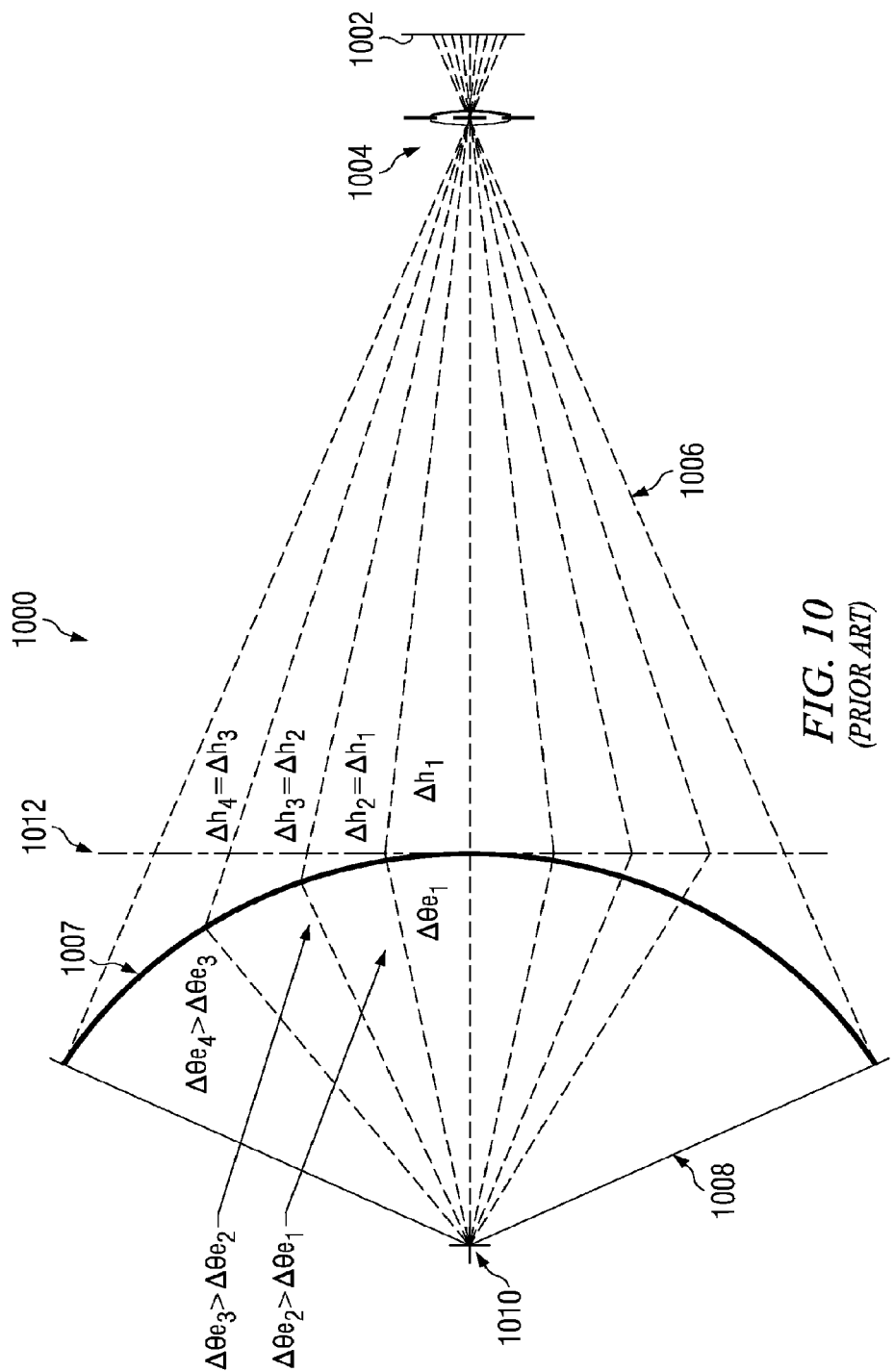
FIG. 10 is a block diagram of a prior art dome shaped rear-projected screen.

FIG. 10 is a block diagram of a prior art spherical rear-projected screen. Projection geometry 1000 is an illustration of an image projected onto a spherical, dome shaped, rear-projected screen. A user sitting at the center curvature at the radius of the sphere views the images displayed on the dome shaped screen.

Image origin 1002 is an origin of an image generated by a fixed rectangular array of sources in a projector, such as an array of pixels. Conventional projection lens 1004 is a lens in the projector that is used to focus and magnify the image generated by the array of sources. Rays 1006 projected from image origin 1002 are separated by a fixed distance "Δh" when sliced by planes.

Screen 1007 is a spherical, dome-shaped rear projection screen. Rays 1006 projected with constant increment of height "Δh" at intersecting plane 1012 produce a lower angular resolution at the edge of screen 1007 than at the center of screen 1007 when viewed from design eyepoint 1010. Thus, when rays with equally spaced height 1006 are projected onto a spherical surface, such as screen 1007, with eyepoint 1010 at the center of curvature, angular rays 1008 from eyepoint 1010 are separated by a constant angle. Instead, angular ray angles 1008 are close together at the center of the screen 1007 than at the edges of screen 1007. In other words, equal height in rays 1006 result in unequal angle separation in rays 1008 and variable resolutions in the displayed image viewed from 1010. This results in inefficient use of pixels and non-optimal image resolution.

In an advantageous embodiment, a single display screen having an optimized screen curvature is provided to display images with a uniform resolution. As shown in FIGS. 9 and 10, prior art flat screens and dome shaped screens do not provide uniform resolution. However, a screen having an optimized curvature in accordance with the embodiment shown in FIG. 11 enables display of images on the screen with uniform resolution.

The uniform resolution screen curvature is the curvature of a screen that is necessary to produce uniform resolution of images displayed on the screen or near uniform resolution. The uniform resolution screen curvature maps equal sized pixels in a projector to equal angles as viewed from the eyepoint in the user's field of view.

Figure 11:
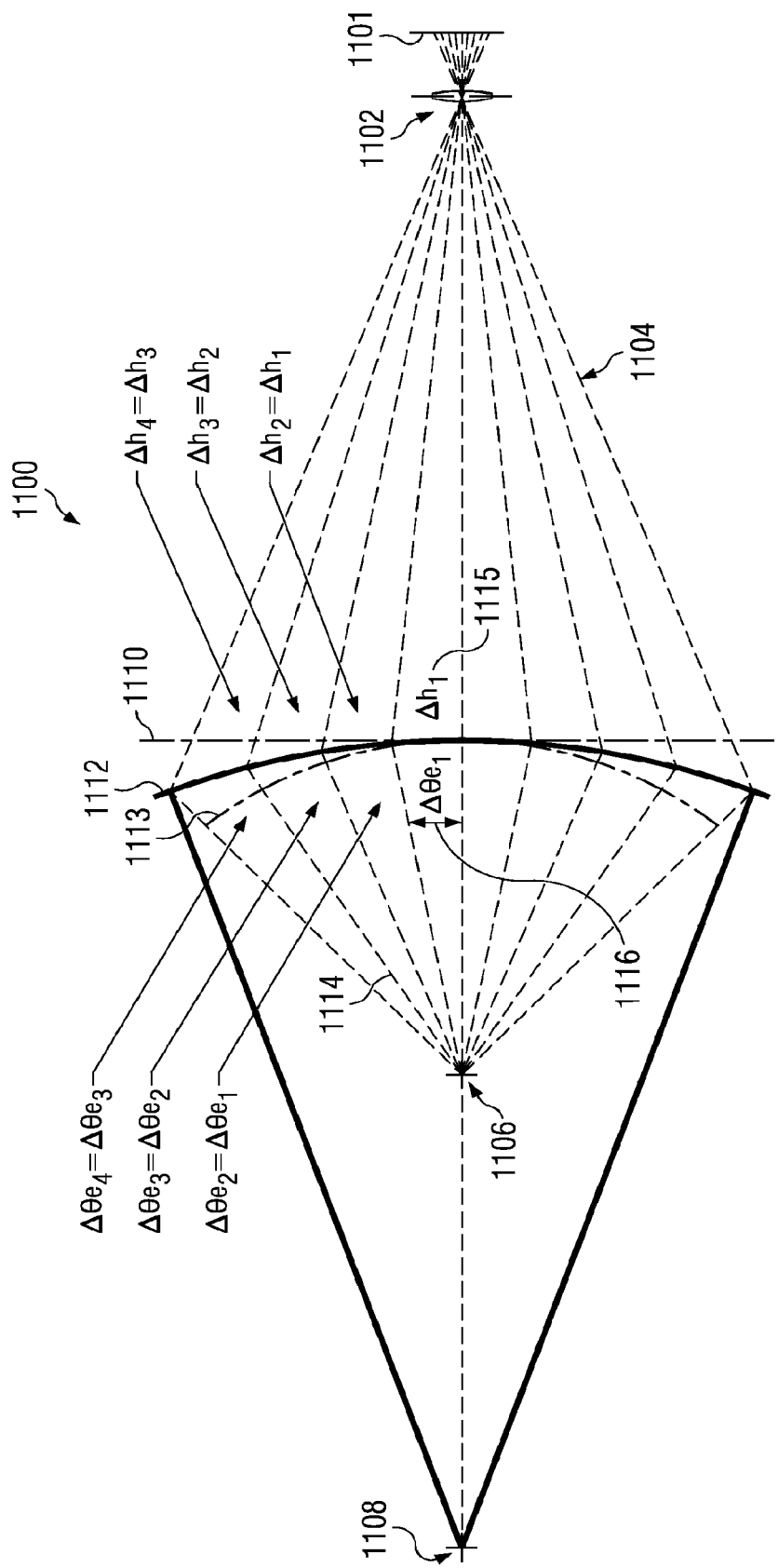
FIG. 11 is a block diagram of a rear-projection screen with a uniform resolution curvature in accordance with an advantageous embodiment.

FIG. 11 is a block diagram of a rear-projection screen with a uniform resolution curvature in accordance with an advantageous embodiment. Projection geometry 1100 is a diagram of an image projected onto a slightly curved screen to generate an image with uniform resolution. Image origin 1101 is an origin of an image generated by a fixed, rectangular array of sources, such as pixels in fixed matrix format projector. Convention projection lens 1102 is implemented as any type of known or available projection lens for projecting an image onto a rear projection screen.

Rays 1104 are projected from image origin 1101 and are separated by a fixed distance "Δh". The equally spaced heights of rays 1104 projected from image origin 1101 and intersect plane 1110. Plane 1110 represents a flat rear projection screen. Curved surface 1112 represents a slightly curved rear projection screen. Curve 1113 represents the location of a traditional curved projection screen with a constant radial distance to design eyepoint 1106. Design eyepoint 1106 is the point at which an observer might observe the image displayed on a flat screen at plane 1110, curved screen 1112 or curved screen 1113. Center of curvature 1108 is a center of curvature of a rear projection screen producing uniform resolution in conjunction with rear projection from a fixed matrix projector. The equal angular rays 1114 from eyepoint 1106 are intersected with the equal height rays 1104 to form a locus of points defining the uniform resolution screen curvature at plane 1112.

Thus, as shown in FIG. 11, there is an optimum screen curvature shown for a screen shown at location 1112 such that equal distances in the format of the projector's imaging chip are mapped onto equal angles for the viewing position at design eyepoint 1106. This curve can be approximated to a high degree of accuracy by an arc of radius larger than the distance from eyepoint 1106 to curve 1112 and which varies with projector distance.

In one embodiment, the curvature of the screen that is necessary to form the uniform resolution screen curvature is determined by projecting rays 1104 from image source 1101, through lens 1102 then through plane 1110 with constant separation Δh 1115. Consequently, rays 1114 with equal-angular separation Δθe 1116 are projected from design eyepoint 1108 towards plane 1110. The locus of points formed by the intersection of constant separation rays 1104 and equal angle separation rays 1114 thereby define the curvature of the uniform resolution screen 1112. The curvature of the uniform resolution screen can be approximated by a section of a sphere with an optimum radius determined by selection of a radius which results in an optimum resolution variation from that produced with the uniform resolution screen.

Figure 12:
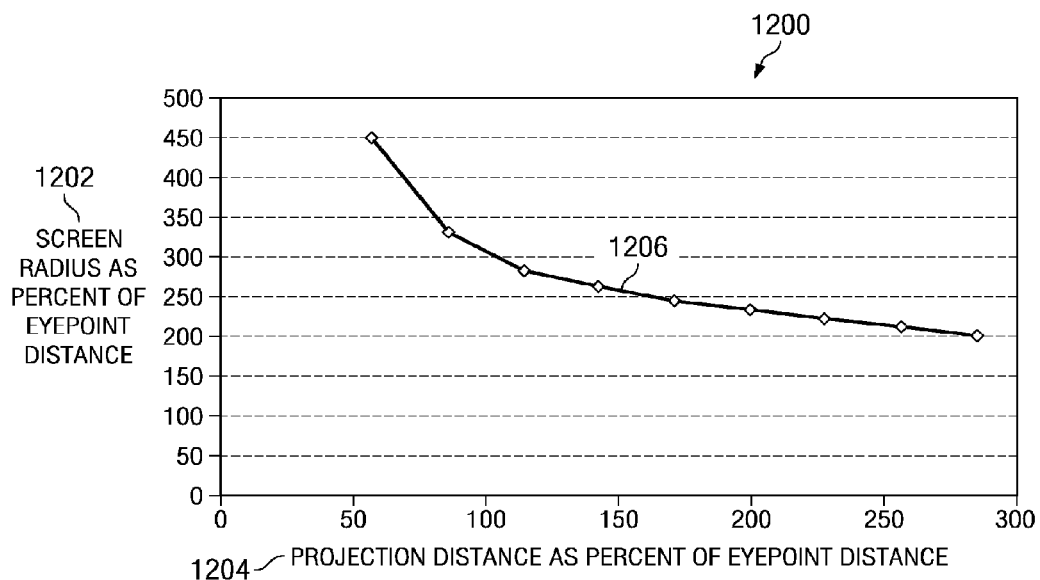
FIG. 12 is a graph illustrating a relationship between screen radius and projection distance in accordance with an advantageous embodiment.

The optimum curvature of the uniform resolution screen is a function of projector distance and eyepoint distance as shown in FIG. 12.

FIG. 12 is a graph illustrating a relationship between screen radius and projection distance in accordance with an advantageous embodiment. Graph 1200 is a graph mapping the relationship between screen radius 1202 and projection distance 1204. In this graph, the optimum relationship between screen radius 1202 and projection distance 1204 is expressed as a percentage of observer viewing distance. As shown in line 1206, the optimum curve in the rear projection screen to produce a uniform resolution in an image displayed on the screen is determined as a function of eyepoint distance and projection distance.

Thus, to determine the optimum curve for a particular screen, an optimum radius is determined. The optimum radius may be identified using line 1206 to determine the optimum relationship between projection distance, viewing distance, and the radius of a sphere. The viewing distance is the distance from an observer's eye to the display screen.

Figure 13:
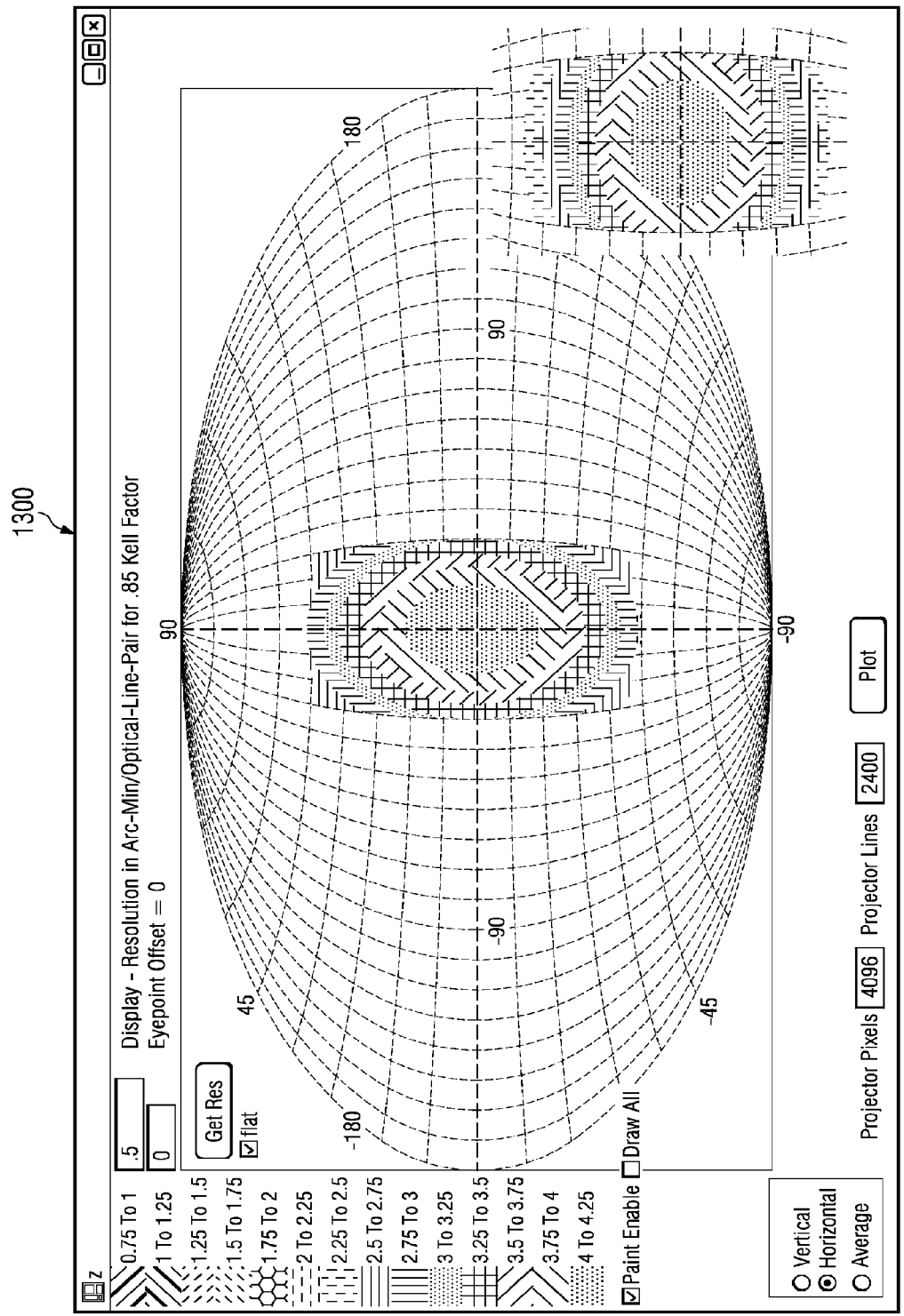
FIG. 13 is a block diagram illustrating a horizontal resolution for a flat screen distance in accordance with an advantageous embodiment.

FIG. 13 is a block diagram illustrating a horizontal resolution for a flat screen distance in accordance with an advantageous embodiment. FIG. 13 shows a horizontal resolution for a flat screen associated with a particular projector used to display a field of view which is 60 degrees wide and 50 degrees up by 45 degrees down as viewed from the design eye, which may be referred to as a lower side screen and is illustrated further in FIG. 16 below.

Display resolution 1300 shows a display resolution in arc-minutes per optical line pair. In optical line pairs, a black line is displayed with a white line. The resolution indicates how many black line and white line pairs can be distinguished by a viewer assuming that the projector provides a particular number of pixels and that the line pairs displayed have been pre-filtered to reduce aliasing to an acceptable level such that the indicated resolution is discernable for any phasing of the line pairs Vs. the pixel structure of the projectors. At 4096 pixels and 2400 projector lines, the horizontal and vertical resolution for a flat screen having a full field of view display image varies across the screen.

Figure 14:
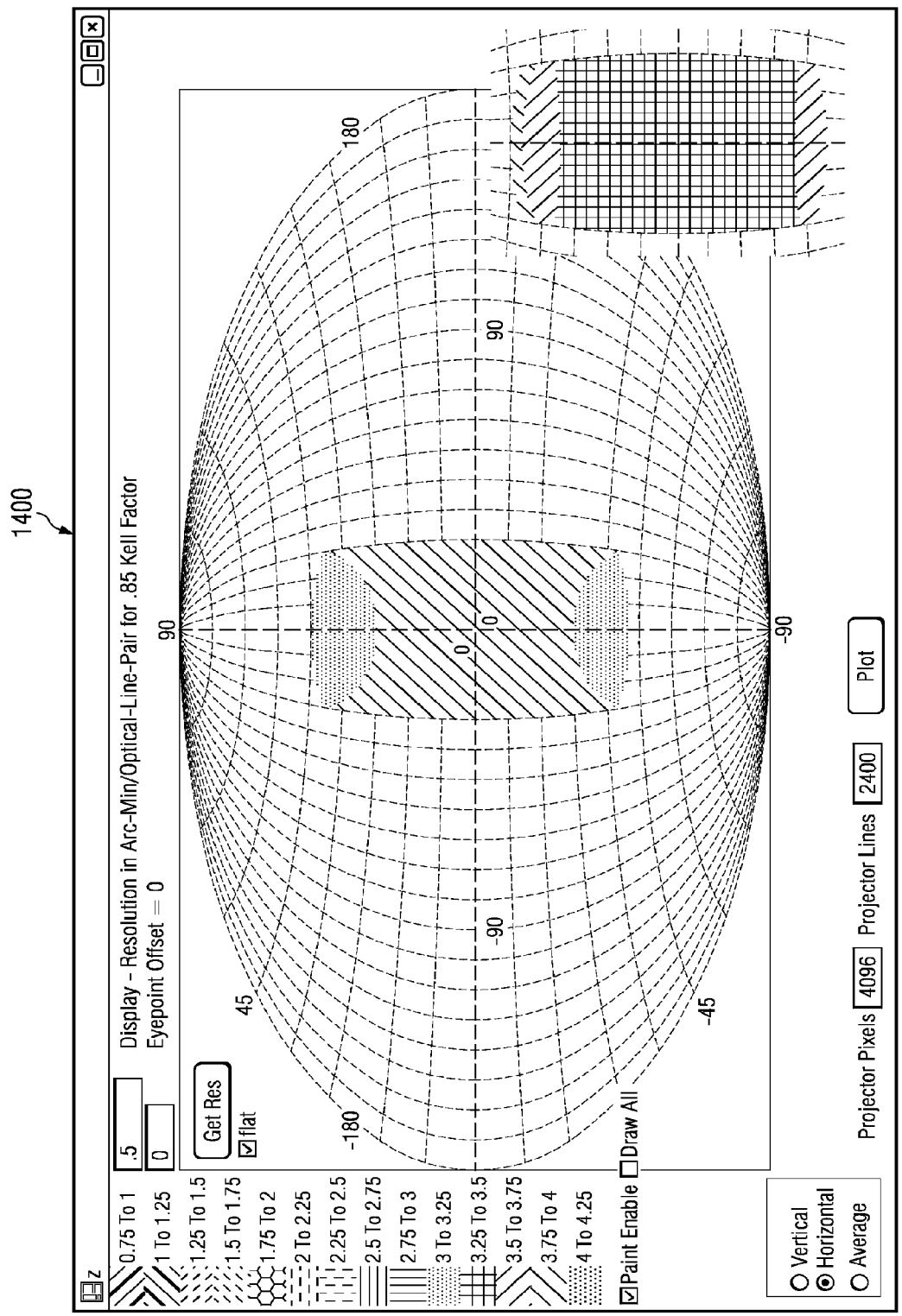
FIG. 14 is a block diagram illustrating a horizontal resolution for a curved screen distance in accordance with an advantageous embodiment.

FIG. 14 is a block diagram illustrating a horizontal and vertical resolution for a curved screen in accordance with an advantageous embodiment but using the same projector, image generator and having the same field of view from the design eye as for the flat screen shown in FIG. 13 above.

Display resolution 1400 shows a display resolution in arc-minutes per optical line pair. At 4096 pixels and 2400 projector lines, the horizontal and vertical resolution for a slightly curved screen having a full field of view display image is nearly uniform across the screen. In addition, the worst case horizontal and vertical resolutions for the optimally curved screen plotted in FIG. 14 are significantly better than the worst case horizontal and vertical resolutions plotted for the flat screen shown in FIG. 13 above.

In this example, a single projector with 4096 by 2400 pixels is used on each lower side screen. However, in another embodiment, the resolution of a particular display configuration with a hexagonal arrangement for fighter aircraft applications, such as simulator 1700 in FIG. 17, may be better than four (4) arc-minutes per pixel pair with standard 1920 by 1080 format high definition projectors which are arranged with three (3) projectors on each lowers side screen. By substituting projectors with at least 3840 by 2160 pixels this same display can be upgraded to provide two (2) arc-minute resolutions. On a curved screen, such as curvature 830 in FIG. 8, the resolution is uniform across the screen.

Figure 15:
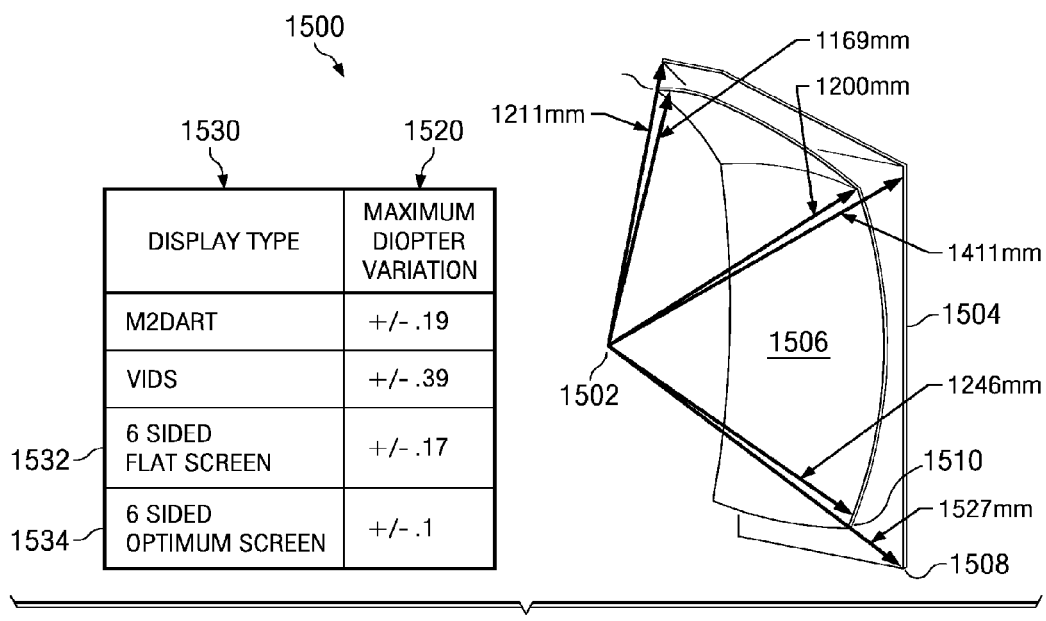
FIG. 15 is a block diagram illustrating eyepoint to screen distance in accordance with an advantageous embodiment.

FIG. 15 is a block diagram illustrating eyepoint to screen distance in accordance with an advantageous embodiment. Eye to screen distances 1500 are distances from an observer's eyepoint 1502 to a flat screen 1504 and a curved screen 1506.

The distances from the observer's eyepoint 1502 to the screens are shown for several critical points. These distances are commonly referred to as eye relief and it is desirable to minimize the variation in these distances as encountered by the viewer in order to reduce the change in accommodation required to focus on the detail found at different points in the wide field of view afforded by the display system. As can be seen, the distance from observer's eyepoint 1502 to flat screen 1504 is greater at each point than the distance from eyepoint to curved screen 1506. For example, the distance from eyepoint 1502 to flat screen 1504 at point 1508 is 1527 millimeters. However, the distance from observer's eyepoint 1502 to corresponding point 1509 on curved screen 1506 is only 1246 millimeters. This is a difference of approximately 281 millimeters in distance from the viewer's eyepoint to the flat screen versus the distance from the viewer's eyepoint to the corresponding point on the curved screen.

Another way of representing eye relief that is especially useful for comparing display and optical systems of different types is by diopter variation. Diopter is a unit of measurement of the refractive power of a lens or curved mirror. A diopter is equal to the reciprocal of the focal length in meters. In this example, a lower diopter variation is preferred to obtain improved image quality and is especially important when a wide field of view display system is used in a tactical aircraft training system in which the pilot is equipped with a helmet mounted cueing system display or night vision goggle display having a fixed focal length adjusted to the midpoint of the extremes of diopter variation of the display system. Since it is often necessary for the pilot to view the helmet mounted cueing display or helmet mounted night vision goggle display at the same time that he is viewing simulated out-the-window imagery on the wide field of view display system, it is important to minimize diopter variation due to the shape and arrangement of the display screens.

Diopter variation 1520 of +/−0.1 diopter is shown for the 6 sided optimum curved screen display system 1534 and +/−0.17 diopter for the comparable flat 6 sided flat screen display 1532. The diopter variation for two display types 1530 currently in use for pilot training, the M2DART and the VIDS are also shown for comparison purposes. As shown in FIG. 15, the diopter variation is shown to be superior in a six-sided flat screen simulator 1532, such as simulator 700 in FIG. 7, and in six-sided curved screen simulators 1534, such as simulator 800 in FIG. 8 as compared to prior art existing design display types.

Thus, the display screens of the full field of view display system provide better resolution uniformity, better worst-case resolution, and lower variation in eye relief by the use of an optimum screen curvature. As a result, this invention is poised to provide the best performance today at the lowest cost as well as providing upgrade paths to the best performance of the future without having to totally redesign the display system. Existing systems may be able to be marginally upgraded to meet near term requirements but those existing systems will need to be extensively modified later when upgrading to higher resolution is required.

In addition, the resolution of a given display system can be improved by utilizing a projector with a greater number of pixels. In other words, if projectors are being used that provide a 20/40 acuity configuration, a 20/20 acuity configuration can be achieved by replacing the projectors with the lower number of pixels with projectors having a higher number of pixels. Thus, this embodiment allows a user to easily upgrade the display system image to full two (2) arc-minute resolution by performing a simple projector exchange.

Figure 16:
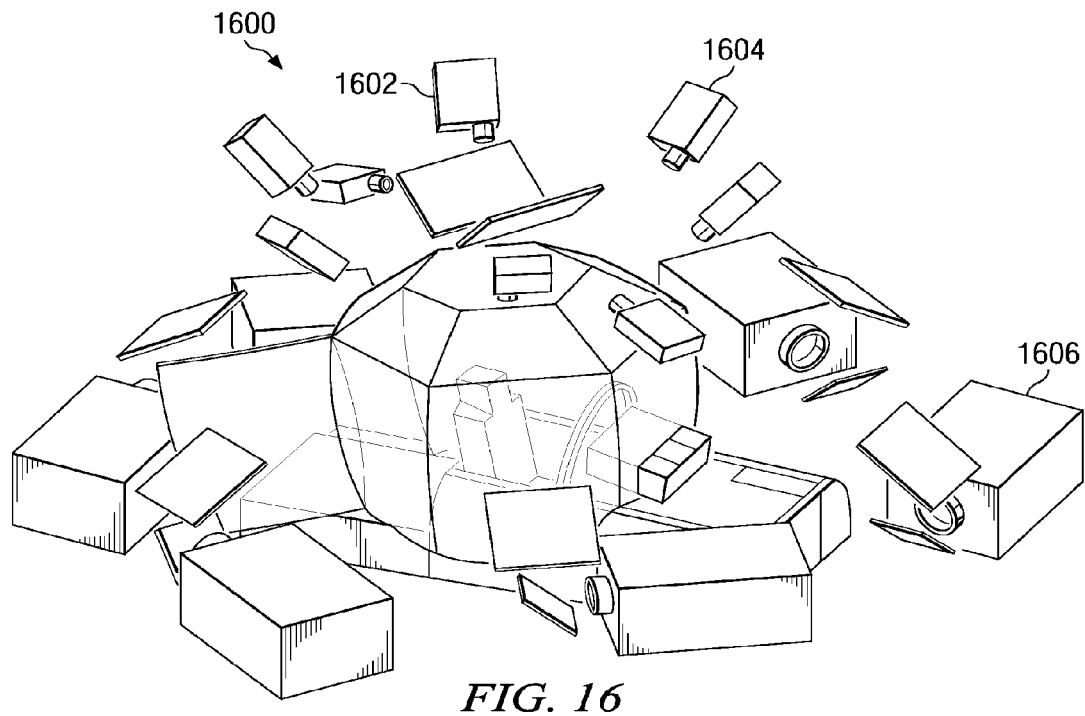
FIG. 16 is a block diagram of a six-sided display system with fourteen projectors in accordance with an advantageous embodiment.

FIG. 16 is a block diagram of a six-sided display system with fourteen projectors in accordance with an advantageous embodiment. Simulator 1600 is a simulator, such as simulator 400 in FIG. 4.

In this example, simulator 1600 is a six-sided display system populated with fourteen high definition type projectors, such as projectors 1602-1606. Simulator 1600 produces a four (4) arc-minute resolution.

Simulator 1600 in this example utilizes different types of projectors. Projector 1604 is a smaller, less powerful projector having only 1920 by 1200 pixels. For example, projector 1606 is a projector having 4096 by 2160 pixels to generate high definition images. Rather than utilizing a set of overlapping projectors to display an image on each side screen, simulator 1600 utilizes a single projector for each side screen. Only a single projector, such as projector 1606 is used to generate images covering the entire side screen, including the upper side screen portion and lower side screen portion of a given side screen. Thus, by using a projector with a higher number of pixels, only a single projector is used for each side screen rather than two or more overlapping projectors. Projector 1606 is rotated into portrait mode using mirrors.

Although the simulator in FIG. 16 utilizes mirrors, the display screens and projectors in this embodiment minimizes the need for different mirrors orientations due to the modularity of the design. In addition, the display system in this example minimizes the complexity of the supporting structure and lighting enclosure.

Figure 17:
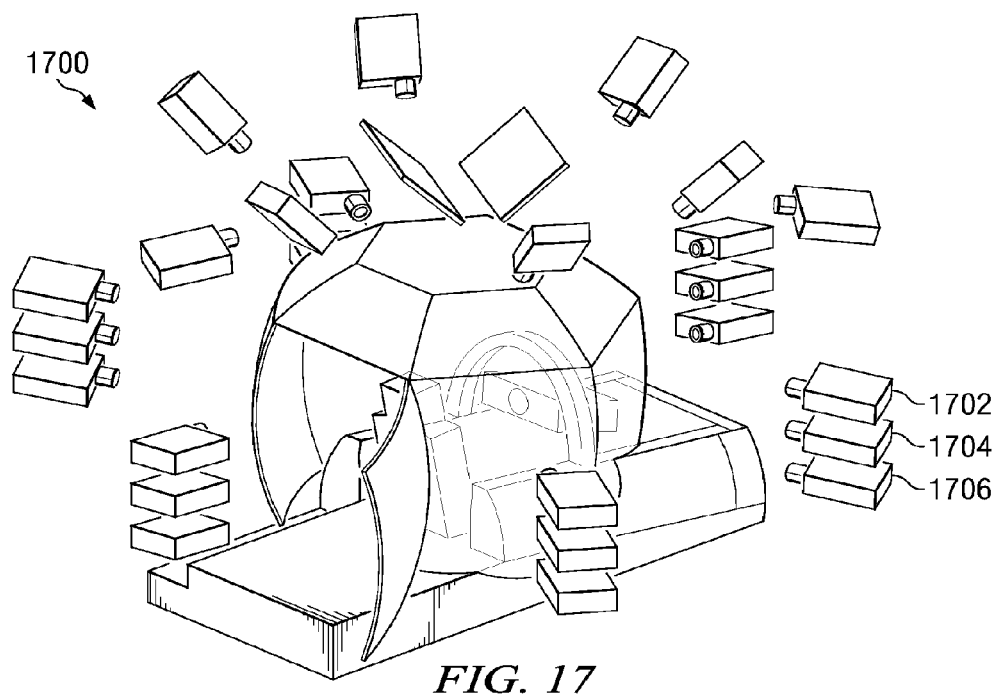
FIG. 17 is a block diagram of a six-sided display system with twenty-six (26) projectors in accordance with an advantageous embodiment.

FIG. 17 is a block diagram of a six-sided display system with twenty-six (26) projectors in accordance with an advantageous embodiment. Simulator 1700 is a simulator, such as simulator 400 in FIG. 4.

In this example, simulator 1700 is a six-sided display system populated with twenty-six (26) projectors of currently available high definition type, such as projectors 1702-1706. These projectors produce a full field of view image with 4.0 arc-minute resolution. When these projectors are each replaced with higher resolution projectors which are also currently available the resolution of the resulting display system can be as good as 2.0 arc-minutes.

Figure 18:
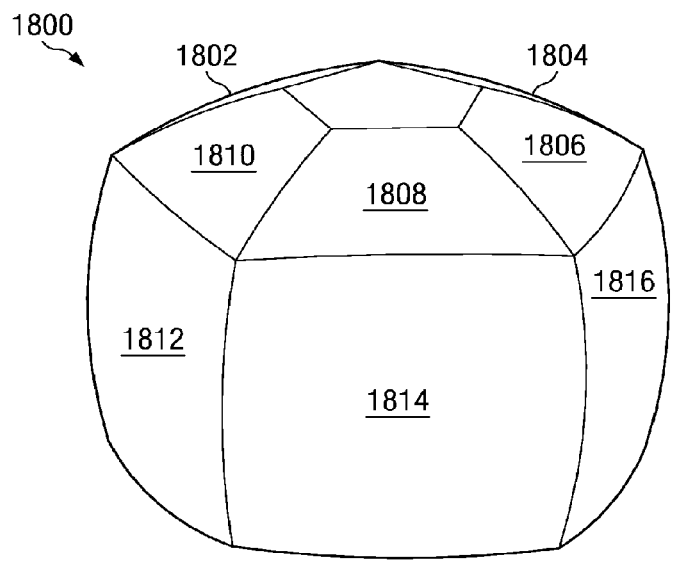
FIG. 18 is a block diagram of a five-sided display system distance in accordance with an advantageous embodiment.

FIG. 18 is a block diagram of a five-sided display system distance in accordance with an advantageous embodiment. Simulator 1800 is a simulator, such as simulator 400 in FIG. 4.

In this example, simulator 1800 includes trapezoidal upper side screens 1802-1810. Each of trapezoidal upper side screens 1802-1810 is associated with a corresponding rectangular lower side screen. In this figure, rectangular lower side screen 1812 is arranged directly below trapezoidal upper side screen 1810.

Rectangular lower side screen 1812 and trapezoidal upper side screen 1810 are partial side screens that are connected or coupled together to form a side screen. Two partial side screens coupled together to form a side screen in this example may be referred to herein as a rectangular-trapezoidal side screen pair.

In FIG. 18, trapezoidal upper side screen 1808 is arranged directly above rectangular lower side screen 1814 to form another rectangular-trapezoidal side screen pair. Trapezoidal upper side screen 1806 is arranged directly above rectangular lower side screen 1816. An additional two rectangular lower side screens associated with trapezoidal upper side screens 1802 and 1804 are not visible in this figure.

Trapezoidal upper side screens 1802-1810 are tilted toward the eyepoint at approximately forty-five (45) degrees in this example. The normal distance from each screen to the eyepoint is nominally one meter. The long axis of projectors as mounted for large rectangular lower side screens 1812-1816 and trapezoidal upper side screens 1802-1810 are all horizontal so that no projector roll is required, and so that all of the projectors for each large rectangular screen and the trapezoidal screen above it can be mounted on a common mechanical structure, which is identical for each of the rectangular-trapezoidal screen pairs.

Figure 19:
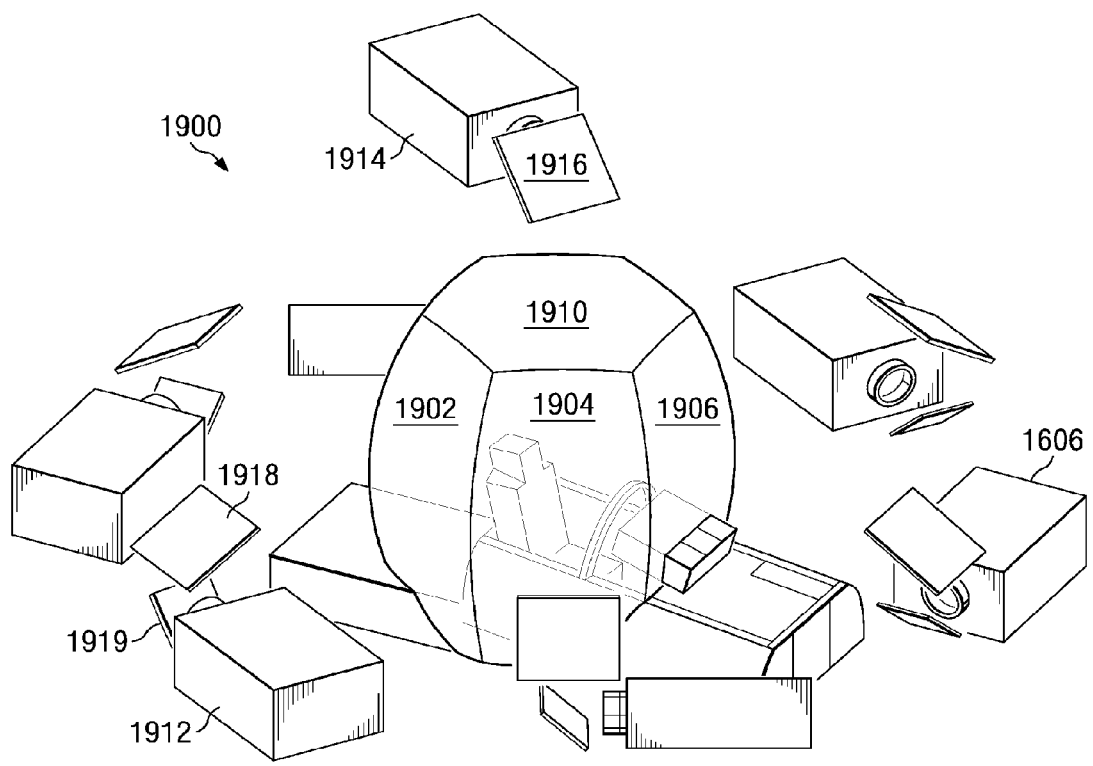
FIG. 19 is an illustration of a visual image and display system in accordance with an advantageous embodiment.

FIG. 19 is an illustration of a visual image and display system in accordance with an advantageous embodiment. Simulator 1900 is a simulator for displaying wide field of view or full field of view display images to a user. Simulator may be implemented as a visual and display system, such as simulator 400 in FIG. 4.

Simulator 400 includes side screens 1902-1906. Side screens 1902-1906 are single unit, one piece side screens that cover an entire side of simulator 1900. In other words, side screen 1902 is a single unit, rather than a side screen that is made of an upper side screen portion and a lower side screen portion connected or associated together to form a side screen.

Side screens 1902-1906 are side screens having a rectangular shape. However, side screens 1902-1906 may be implemented using screens having a square shape, pentagonal shape, trapezoidal shape, or any other shape.

Simulator 1900 includes a set of projectors, such as projector 1912 and 1914. In this example, a single projector projects an image on a single side screen. For example, projector 1912 projects an image on side screen 1902. Simulator 1900 optionally includes a set of mirrors, such as mirrors 1918 and 1919. In this example, mirror 1918 and 1919 are used to rotate an image generated by projector 1912 into a portrait mode for display in a correct orientation of the image on side screen 1902 for viewing by a user located inside simulator 1900. Projector 1914 is positioned above top screen 1910 and configured with a single fold mirror 1916 oriented to direct the image downward onto the top screen without necessarily rotating the image.

The display screens and projectors shown in FIGS. 4-19 are only examples of possible configurations of display screens and projectors. The advantageous embodiments are not limited to the configurations of screens and projectors shown in FIGS. 4-19. Simulators in accordance with the advantageous embodiments may include different numbers of projectors than the projectors shown in the figures and different arrangements of the projectors in relation to the display screens.

Figure 20:
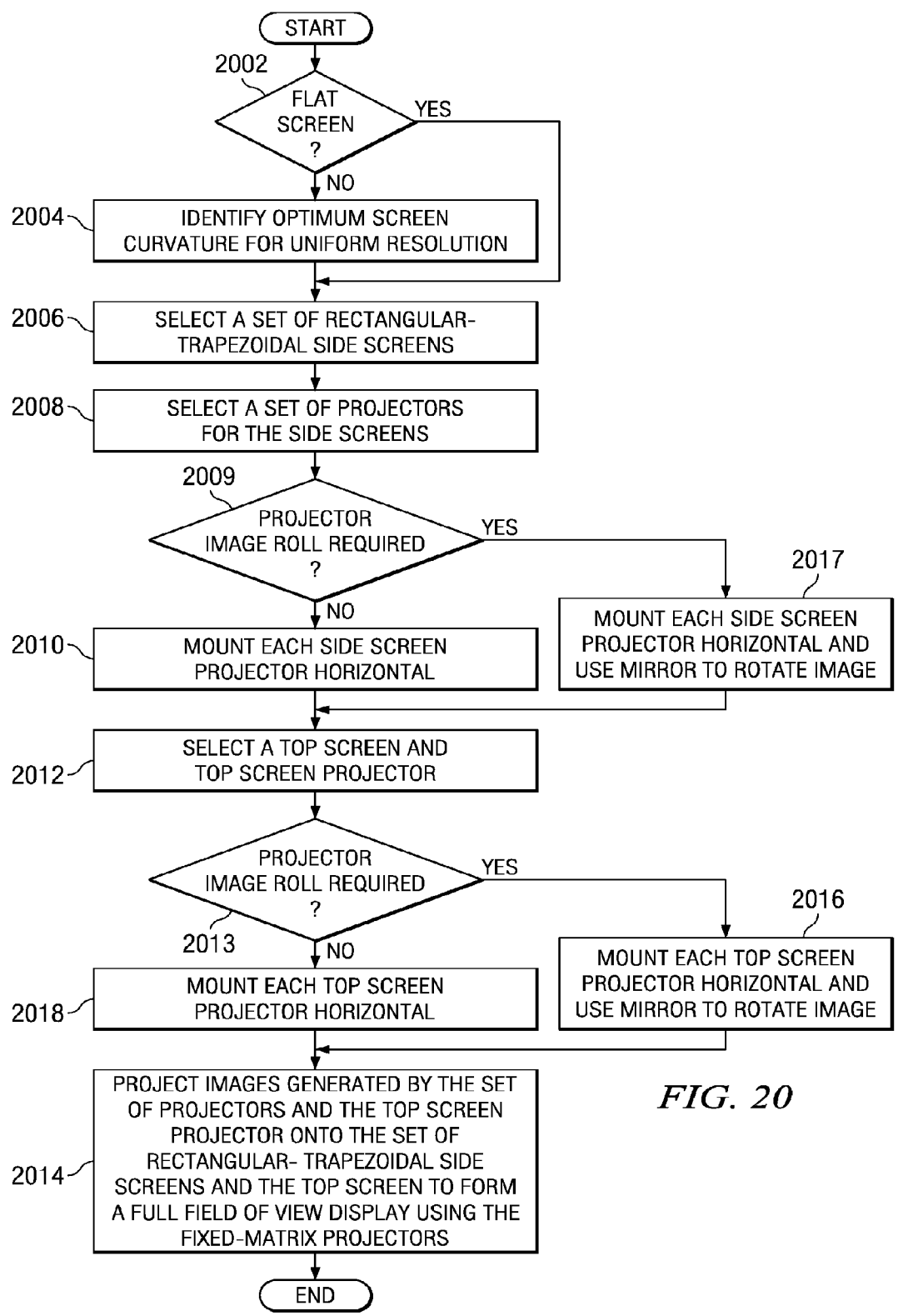
FIG. 20 is a flowchart illustrating a process for generating a wide field of view display system in accordance with an advantageous embodiment.

FIG. 20 is a flowchart illustrating a process for generating a wide field of view display system in accordance with an advantageous embodiment. The process begins when a determination is made as to whether flat screens are to be used (operation 2002). If flat screens are not to be used, uniform resolution screen curvature is identified to produce a uniform resolution in displayed images across the screen (operation 2004). A uniform resolution screen curvature is identified for each display screen. The optimum radius is identified based on eyepoint and projection distance, as shown in FIG. 12.

After a curvature is identified at operation 2004 or if flat screens are being used at step 2002, a set of side screen pairs are selected (operation 2006). After selecting a set of side screen pairs, then, a set of side screen projectors is selected (operation 2008). A determination is made as to whether projector image roll is required (operation 2009. If projector image roll is not required, the set of selected projectors for the side screen pairs is mounted horizontally (operation 2010). If projector image roll is required, each projector is mounted horizontally and mirrors are used to rotate the image (operation 2017).

After mounting each side screen projector, a top screen and a top screen projector is selected (operation 2012) to form the simulator. In other words, the completed simulator includes the set of side screen pairs, the top screen, the top screen projector, and the set of projectors for the side screens.

A determination is made as to whether top screen projector image roll is required (operation 2013). If projector image roll is not required, the top screen projector is mounted horizontally (operation 2018). If image roll is required (operation 2013) the top screen projector is mounted horizontally and mirrors used to roll the image (operation 2016).

If projector image roll is required at operation 2013 and has been rotated by mirrors and the top projector has been mounted horizontally (operation 2018) or if projector image roll is not required and the projector has been mounted horizontally (operation 2018), the simulator projects images generated by the set of side screen projectors and the top screen projector onto the set of side screens and the top screen to form a full field of view display using fixed-matrix projectors (operation 2014) with the process terminating thereafter.

Figure 21:
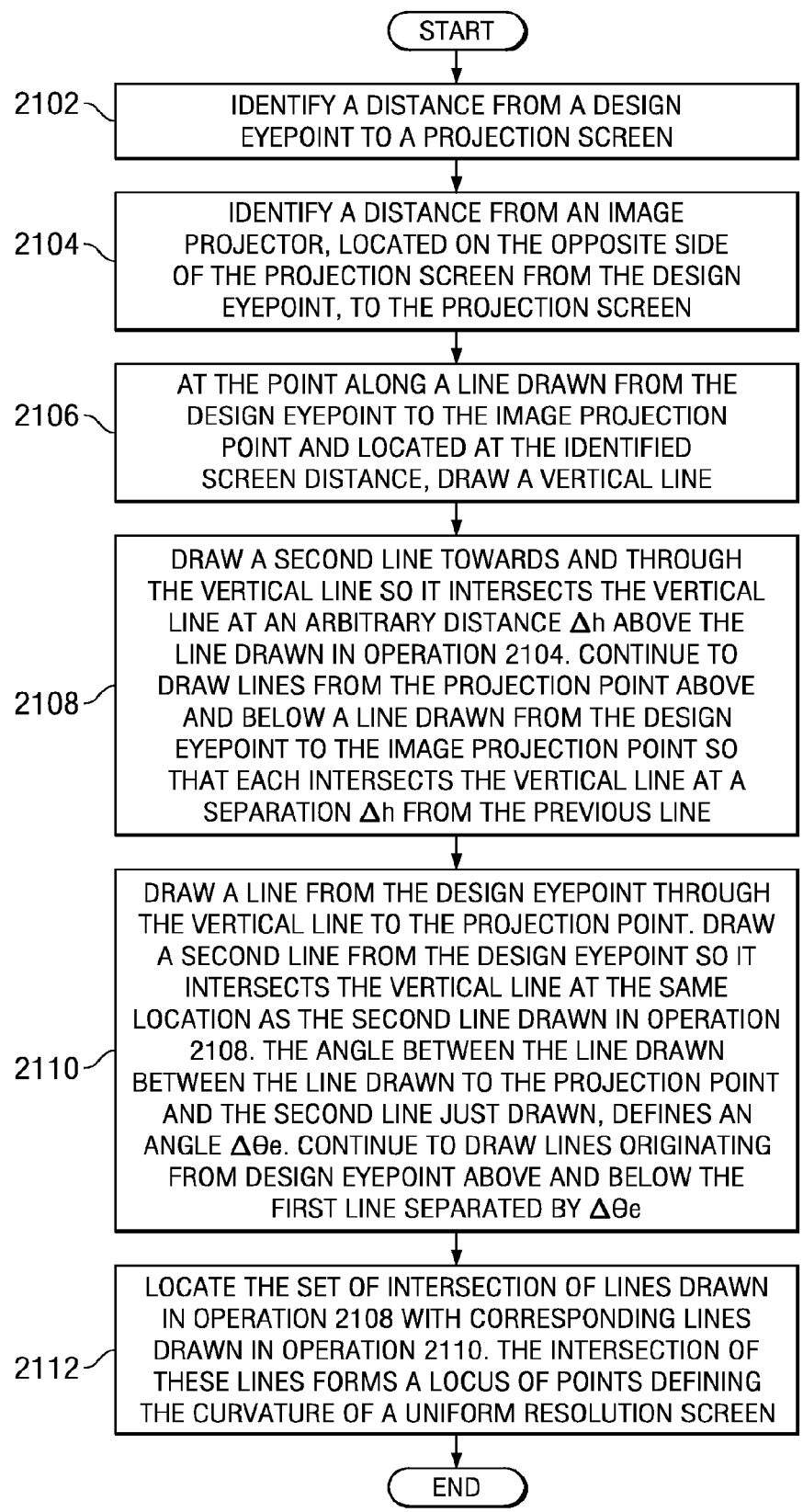
FIG. 21 is a flowchart illustrating a process for creating a uniform resolution display screen in accordance with an advantageous embodiment.

FIG. 21 is a flowchart illustrating a process for creating a uniform resolution display screen in accordance with an advantageous embodiment. A distance from a design eyepoint to a projection screen is identified (operation 2102). A distance from an image projector, located on the opposite side of the projection screen from the design eyepoint, to the projection screen is identified (operation 2104). At the point along a line drawn from the design eyepoint to the image projection point and located at the identified screen distance, a vertical line is drawn (operation 2106).

A second line is drawn towards and through the vertical line so it intersects the vertical line at an arbitrary distance Δh above the line drawn in operation 2104. Lines are continued to be drawn from the projection point above and below a line drawn from the design eyepoint to the image projection point so that each intersects the vertical line at a separation Δh from the previous line. (operation 2108). Next a line is drawn from the design eyepoint through the vertical line to the projection point.

A second line is drawn from the design eyepoint so it intersects the vertical line at the same location as the second line drawn in operation 2108. The angle between the line drawn between the line drawn to the projection point and the second line just drawn, defines an angle Δθe. Lines are continued to be drawn originating from design eyepoint above and below the first line separated by Δθe (operation 2110). A set of intersection of lines drawn in operation 2108 with corresponding lines drawn in operation 2110 is located. The intersection of these lines forms a locus of points defining the curvature of a uniform resolution screen (operation 2112) with the process terminating thereafter.

The uniform resolution display screen provides more uniform resolution than either prior art flat screens or dome shaped screens. Consequently, it also produces a better worst case resolution for a given field of view from the viewer eyepoint and a given number of pixels arranged across that field of view. This is obvious because in a non uniform resolution display there are variations in resolution such that some parts of the display are better than the average of the resolution at all of the parts of the display whereas on a uniform or nearly uniform resolution display all parts have resolution equal to or very near the average resolution. This is important to the design of a visual simulator for pilot training because the part of the display in which important visual detail will appear in a training scenario cannot be predicted in advance. Therefore the visual display system must be designed so that all parts of the display meet or exceed the worst case resolution value which has been determined to be required for performance of the most critical training tasks. The uniform resolution wide field of view display system described herein can provide that critical worst case resolution with fewer pixels and hence at lower cost than any other display system.

An embodiment of the present disclosure provides a visual image projection and display system. The visual image projection and display system comprises a tessellation of spherical surfaces acting as rear-projection screens and a plurality of projectors located on a convex side of each spherical surface in the tessellation of spherical surfaces. A geometrically normal ray from a point on a concave side of a first spherical surface in the tessellation of spherical surfaces intersects with a geometric normal ray from a point on a concave side of each other spherical surfaces in the tessellation of spherical surfaces at or near an eye position of an observer. Each projector in the plurality of projectors generates an image having an aspect ratio of approximately sixteen by nine (16:9) to form a plurality of images, and wherein the plurality of images is blended on each screen surface to produce a uniform resolution image.

In another advantageous embodiment, a method of producing a uniform resolution image from a tessellation of spherical surfaces acting as rear-projection screens is provided. A set of lower side screens is selected. The screens in the set of lower side screens have a first selected curvature. A set of upper side screens is selected. The screens in the set of upper side screens have a second selected curvature. Each screen in the set of lower side screens is associated with a corresponding screen in the set of upper side screens to form a side screen pair. The set of upper side screens and the set of lower side screens form a set of side screen pairs. A top screen is selected. The set of lower side screens, the set of upper side screens, and the top screen form a tessellated sphere of display screens. A set of projectors is selected. Each projector in the set of projectors generates images formatted for high definition. The set of side screen pairs, the top screen, the set of side screen projectors, and the top screen projector form a visual image and display system. The visual image and display system generate a full field of view display with a uniform resolution on a surface of the tessellated sphere of display screens.

In yet another advantageous embodiment, a flight simulator is provided that comprises a set of screens having a selected curvature and a set of projectors. The selected curvature is identified based on a relationship between a projection distance from a projector to a given screen in the set of screens and a viewing distance from an eyepoint of an observer to the given screen, wherein images displayed on screens in the set of screens having the selected curvature are displayed with uniform resolution. The set of projectors generate images displayed on the set of screens to form a full field of view display.

The display system of the advantageous embodiments provides an improved flight simulator. The display system may also be used in vehicle driver simulators, marine simulators, and other simulation devices. The display system may be used for improved training of pilots, drivers, mechanics, flight crew, and other personnel. The display system may also be used for design and development of vehicles and aircraft. In addition, the display system may also be used for education, such as in planetariums, as well as in entertainment.

An advantageous embodiment creates an eye-limited 2 arc-minute resolution or nearly eye-limited 4 arc minute, full field of view display system depending only upon the choice of projectors used. It efficiently tiles the full field of view of an air combat training visual display system with modern display high definition aspect ratio projectors and optimizes resolution uniformity with a minimum of wasted pixels.

The apparatus solves the problem of inefficient utilization of image generator and display pixels when these pixels are projected by fixed matrix projectors, such as high definition format liquid crystal on silicon (LCoS) or digital light processing (DLP), rather than analog projectors, such as cathode ray tube (CRT), to form a continuous full field of view image on a rear projection screen for viewing by a pilot in a flight simulator.

The display system is a more efficient use of projector and image generator pixels than is available today from existing solutions. It does this by optimizing screen shape and curvature for high definition format projectors. Efficient use of pixels is important because such pixels are very expensive to procure and to support, and as a result, the visual system may drive the cost of fielding and supporting a mission-training center more than any other subsystem. The display system also provides increased modularity, which reduces procurement costs and support costs. The display systems are also well suited to applications, which require integration with helmet displays and night vision goggles.

The flowcharts and block diagrams in the different depicted embodiments illustrate the architecture, functionality, and operation of some possible implementations of the apparatus and methods. The function or functions noted in the flowchart operations may occur out of the order noted in the figures. For example, in some cases, two operations shown in succession may be executed substantially concurrently, or the operations may sometimes be executed in the reverse order, depending upon the operation involved.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A uniform resolution display screen comprising:
   a surface of the uniform resolution display screen having a curvature configured to display images with a uniform resolution across the uniform resolution display screen, wherein the curvature is based on a projection distance from a projector to the uniform resolution display screen and a viewing distance from an eyepoint of an observer to the uniform resolution display screen, the curvature of the screen is configured based on a locus of points created by an intersection of lines drawn at equal angular increments from the eyepoint with a set of lines drawn at equal pixel increments at an image source through the projection point; and
   a geometry of the display screen, wherein the geometry of the display screen is configured to display images associated with a high definition imaging format.

2. The uniform resolution display screen of claim 1 wherein a worst case resolution of an image displayed on the uniform resolution display screen with a given field of view and a given number of pixels produces the image with a better resolution than a worst case resolution of the image displayed on a flat display screen or a dome shaped display screen with the given field of view and the given number of pixels.

3. The uniform resolution display screen of claim 1 wherein the geometry of the uniform resolution display screen is an n-sided polygon geometry selected from a group consisting of a rectangular geometry, a trapezoidal geometry, or a pentagonal geometry.

4. The uniform resolution display screen of claim 1, wherein the observer is positioned on a first side of the display screen and the projector is positioned on a second side of the display screen.

5. The uniform resolution display screen of claim 1, wherein the display screen displays an image in approximately a sixteen by nine aspect ratio.

6. A visual display system for use in a simulator comprising:
   a set of screens having a selected curvature, wherein the selected curvature is determined using a locus of points created by an intersection of lines drawn at equal angular increments from an eyepoint with a set of lines drawn at equal pixel increments at an image source through a projection point, wherein images displayed on screens in the set of screens having the selected curvature are displayed with uniform resolution, the curvature of the screen is configured based on a locus of points created by an intersection of lines drawn at equal angular increments from the eyepoint with a set of lines drawn at equal pixel increments at an image source through the projection point; and a set of projectors, wherein the set of projectors generate images displayed on the set of screens to form a full field of view display.

7. The visual display system of claim 6 wherein the set of screens further comprises:
 a top screen; and
 a set of side screens, wherein the set of side screens comprises partial side screens, and wherein the set of side screens is tessellated, wherein a geometrically normal ray from a point on a concave side of the spherical surface intersects with a geometric normal ray from a point on a concave side of each other spherical surface near an eye position of an observer.

8. The visual display system of claim 7, wherein each screen in the set of side screens further comprise a set of partial side screens comprising a rectangular or trapezoidal shaped screen.

9. The visual display system of claim 7, wherein a screen in the set of side screens forms a square, pentagonal, or hexagonal configuration.

10. The visual display system of claim 6 wherein the set of projectors generate images on the set of screens with an aspect ratio of approximately sixteen by nine to form a high definition, full field of view display.

11. The visual display system of claim 6 further comprising at least one projector associated with each screen in the set of screens.

12. The visual display system of claim 6, wherein the observer is positioned on a first side of a screen in the set of screens and a projector associated with the screen is positioned on a second side of the screen.

13. A flight simulator comprising:
 a number of screens;
 a number of projectors; and
 the screens in the number of screens having a curvature, the curvature defined by a locus of points defined by an intersection of a set of constant separation rays and a set of equiangular separation rays, the set of constant separation rays being defined by projecting rays from an image source, through a lens, and through a plane with a constant separation, and the set of equiangular separation rays defined by projecting rays with equiangular separation from a design eyepoint towards the plane.

14. The flight simulator of claim 13 further comprising an imaging chip, such that equal distances in the format of the projector's imaging chip are mapped onto equal angles for the viewing position at the eyepoint.

15. The flight simulator of claim 13, wherein the number of screens comprises a set of lower side screens and a set of upper side screens.

16. The flight simulator or claim 15, wherein the set of lower side screens comprise curved rectangular screens.

17. The flight simulator of claim 15, wherein the set of upper side screens comprise trapezoidal shaped screens.

18. The flight simulator of claim 15 further comprising a display configured on the number of screens in approximately a sixteen by nine aspect ratio.

* * * * *